US010007534B2

(12) United States Patent
Williams et al.

(10) Patent No.: US 10,007,534 B2
(45) Date of Patent: Jun. 26, 2018

(54) METHODS AND APPARATUS TO MANAGE ASSET CAPABILITIES IN A COMPUTING ENVIRONMENT USING A COMMON AGENT FRAMEWORK

(71) Applicant: VMware, Inc., Palo Alto, CA (US)

(72) Inventors: Brian Williams, Woodland Park, CO (US); Gregory Burk, Colorado Springs, CO (US); Michael Donahue, Colorado Springs, CO (US)

(73) Assignee: VMware, Inc., Palo Alto, CA (US)

( * ) Notice: Subject to any disclaimer, the term of this patent is extended or adjusted under 35 U.S.C. 154(b) by 170 days.

(21) Appl. No.: 14/824,049

(22) Filed: Aug. 11, 2015

(65) Prior Publication Data
US 2017/0046181 A1    Feb. 16, 2017

(51) Int. Cl.
| | | |
|---|---|---|
| G06F 3/00 | (2006.01) | |
| G06F 9/44 | (2018.01) | |
| G06F 9/46 | (2006.01) | |
| G06F 13/00 | (2006.01) | |
| G06F 9/445 | (2018.01) | |
| G06F 21/60 | (2013.01) | |
| H04L 29/06 | (2006.01) | |

(52) U.S. Cl.
CPC ........ *G06F 9/44526* (2013.01); *G06F 21/604* (2013.01); *H04L 63/0823* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 2002/0199119 | A1* | 12/2002 | Dunnion ................. | H04L 12/58 726/4 |
| 2007/0266136 | A1* | 11/2007 | Esfahany ............... | H04L 41/022 709/223 |
| 2010/0153920 | A1* | 6/2010 | Bonnet ..................... | G06F 8/36 717/122 |

(Continued)

OTHER PUBLICATIONS

"Windows Management Instrumentation and the Common Information Model," Microsoft Corporation, Nov. 1998, retrieved from <https://msdn.microsoft.com/en-us/library/ms811552(d=printer).aspx>, retrieved on Jul. 17, 2015 (5 pages).

(Continued)

*Primary Examiner* — Chat Do
*Assistant Examiner* — William C Wood
(74) *Attorney, Agent, or Firm* — Hanley, Flight & Zimmerman, LLC

(57) ABSTRACT

Methods, apparatus, systems and articles of manufacture are disclosed to manage asset in a computing environment using a common agent framework. An example method includes maintaining a catalog of capabilities available to an asset based on plugins installed at the asset. The example method also includes determining whether a capability is installed at the asset based on the catalog of capabilities, and installing the capability at the asset when the capability is not installed at the asset. The example method also includes receiving, at the asset, a request to perform the capability, validating, via a processor, the request, and, in response to the validating, performing the capability.

16 Claims, 14 Drawing Sheets

(56) References Cited

U.S. PATENT DOCUMENTS

| | | | |
|---|---|---|---|
| 2012/0259466 A1* | 10/2012 | Ray | G05B 15/02 |
| | | | 700/275 |
| 2012/0304286 A1* | 11/2012 | Croll | G06F 21/6263 |
| | | | 726/22 |
| 2014/0047433 A1* | 2/2014 | Gaither | G06F 8/61 |
| | | | 717/176 |
| 2014/0201164 A1* | 7/2014 | Skinder | G06F 21/6218 |
| | | | 707/687 |
| 2015/0296025 A1* | 10/2015 | Okabayashi | H04L 67/141 |
| | | | 709/201 |
| 2016/0188421 A1* | 6/2016 | Karinta | G06F 17/30345 |
| | | | 707/654 |

OTHER PUBLICATIONS

"Windows Management Instrumentation," Wikipedia, last modified May 29, 2015, retrieved from.<https://en.wikipedia.org/w/index.php?title=Windows_Management_Instrumentation&oldid=664554305>, retrieved on Jul. 17, 2015 (7 pages).

Lee, So-Jung, et al., "Design of a WBEM-based Management System for Ubiquitous Computing Servers," Academic Alliance Paper Competition for (2004), Dec. 1, 2014 (17 pages).

* cited by examiner

Example Provider Registration File

```
<?xml version = "1.0" encoding = "UTF-8"?>
<caf:providerReg
    xmlns:caf = "http://schemas.entity.com/caf/schema/fx"
    xmlns:xsi = "http://www.w3.org/org/2001/XMLSchema-instance"
    xsi:schemaLocation = "http://schemas.entity.com/caf/schema/fx
http://1.2.3.4/caf-downloads/schema/fx/PluginInfra.xsd"
    pluginNamespace = "Entity1"
    pluginName = "AgentInstaller"
    pluginVersion = "1.0.0"
    invokerRelPath = "Entity1_AgentInstaller_1_0_0"
    staleSec = "1000"
    isSchemaVisible = "true"/>
```

- 300 — overall file
- 305 — caf:providerReg block
- 310, 315 — pluginNamespace = "Entity1"
- 320, 325 — pluginName = "AgentInstaller"
- 330, 335 — pluginVersion = "1.0.0"
- 340 — invokerRelPath = "Entity1_AgentInstaller_1_0_0"
- 345 — staleSec = "1000"

FIG. 3

Example Plugin Invoker File

```
!/bin/sh thisdir = $(dirname $(readlink -f $0))
. /etc/entity-caf/pme/config/cafenv.config export LD_Library_Path = $LD_Library_Path:$CAF_Lib_Dir:$CAF_Python_Dir/lib    ←405
$CAF_Python_Dir/bin/python    ←410
$CAF_Plugin_Dir/App1_Agent_Installer_1_0_0/Application_Agent_Plugin.py $*    ←415
```

Example Invoke Request File

```
<caf:mgmtRequest clientId = "1234-abcd-11bb33dd"
pmeId = "abcd-1122-33dd12"
requestID = "ab34-aabb-cc44ab"
xmlns:caf = "http://schemas.entity.com/caf/schema/fx"
xmlns:xsi = "http://www.w3.org/2001/XMLSchema-instance"
xsi:schemaLocation = "http://schemas.entity.com/caf/schema/fx
http://1.2.3.4/caf-downloads/schema/fx/MgmtRequest.xsd">
  <batch>
    <invokeOperationCollection>
      <invokeOperation jobId = "12345-abcde-12233455">
        <classSpecifier>
          <fullyQualifiedClass classNamespace = "Application1"
className = "AppAgent" classVersion = "1.0.0"/>
        </classSpecifier>
        <operation name = "installRpm">
          <parameterCollection>
            <parameter name = "rpmAttachmentName" type = "String">
              <value>rpmAttachment</value>
            </parameter>
          </parameterCollection>
        </operation>
      </invokeOperation>
    </invokeOperationCollection>
  </batch>
  <attachmentCollection>
  <attachment isReference = "false" name = "rpmAttachmentName" type = "file"
uri = "file:///val/lib/entity-caf/client/data/input/application-agent-1.2.3.rpm"/>
  </attachmentCollection>
  ...
</caf:mgmtRequest>
```

| Plugin Namespace | Plugin Name | Plugin Version | Plugin Invoker |
|---|---|---|---|
| Entity1 | AgentInstaller | 1.0.0 | Entity1_Agent_Installer_1_0_0 |
| Application2 | LatencyMonitor | 1.3.5 | App2_Latency_Monitor_1_3_5 |
| Application2 | AgentInstaller | 1.0.0 | App2_Agent_Installer_1_0_0 |
| ... | ... | ... | ... |

Registered Plugins-Invokers Mappings

FIG. 6

| Class Namespace | Class Name | Class Version | Capability Name | Plugin Namespace | Plugin Name | Plugin Version |
|---|---|---|---|---|---|---|
| Entity1 | AppAgent | 1.0.0 | installRpm | Entity1 | AgentInstaller | 1.0.0 |
| Entity1 | AppAgent | 1.0.0 | uninstallRpm | Entity1 | AgentInstaller | 1.0.0 |
| Application2 | MonitorAgent | 1.0.0 | SLACheck | Application2 | LatencyMonitor | 1.3.5 |
| ... | ... | ... | ... | ... | ... | ... |

Capability-Plugin Mappings

FIG. 8

METHODS AND APPARATUS TO MANAGE ASSET CAPABILITIES IN A COMPUTING ENVIRONMENT USING A COMMON AGENT FRAMEWORK

FIELD OF THE DISCLOSURE

This disclosure relates generally to computing environments, and, more particularly, to methods and apparatus to manage asset in a computing environment using a common agent framework.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives a developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

BRIEF DESCRIPTION OF THE DRAWINGS

FIG. 3 illustrates an example plugin registration file that may be used by the example capabilities management agent of FIGS. 1A, 1B and/or 2 to register the example plugin of FIGS. 1A and/or 1B.

FIG. 4 illustrates an example plugin invoker file that may be used by the example capabilities management agent of FIGS. 1A, 1B and/or 2 to invoke the example plugin of FIGS. 1A and/or 1B.

FIG. 5 illustrates an example invoke request file that may be executed by the example capabilities management agent of FIGS. 1A, 1B and/or 2 to invoke a capability.

FIG. 6 illustrates an example data table that may be employed by the example plugins registrar of FIG. 2 to store registered plugins-invoker mappings.

FIG. 8 illustrates an example data table that may be employed by the example capabilities management agent of FIGS. 1A, 1B and/or 2 to store capability-plugin mappings.

DETAILED DESCRIPTION

Figure 1A:
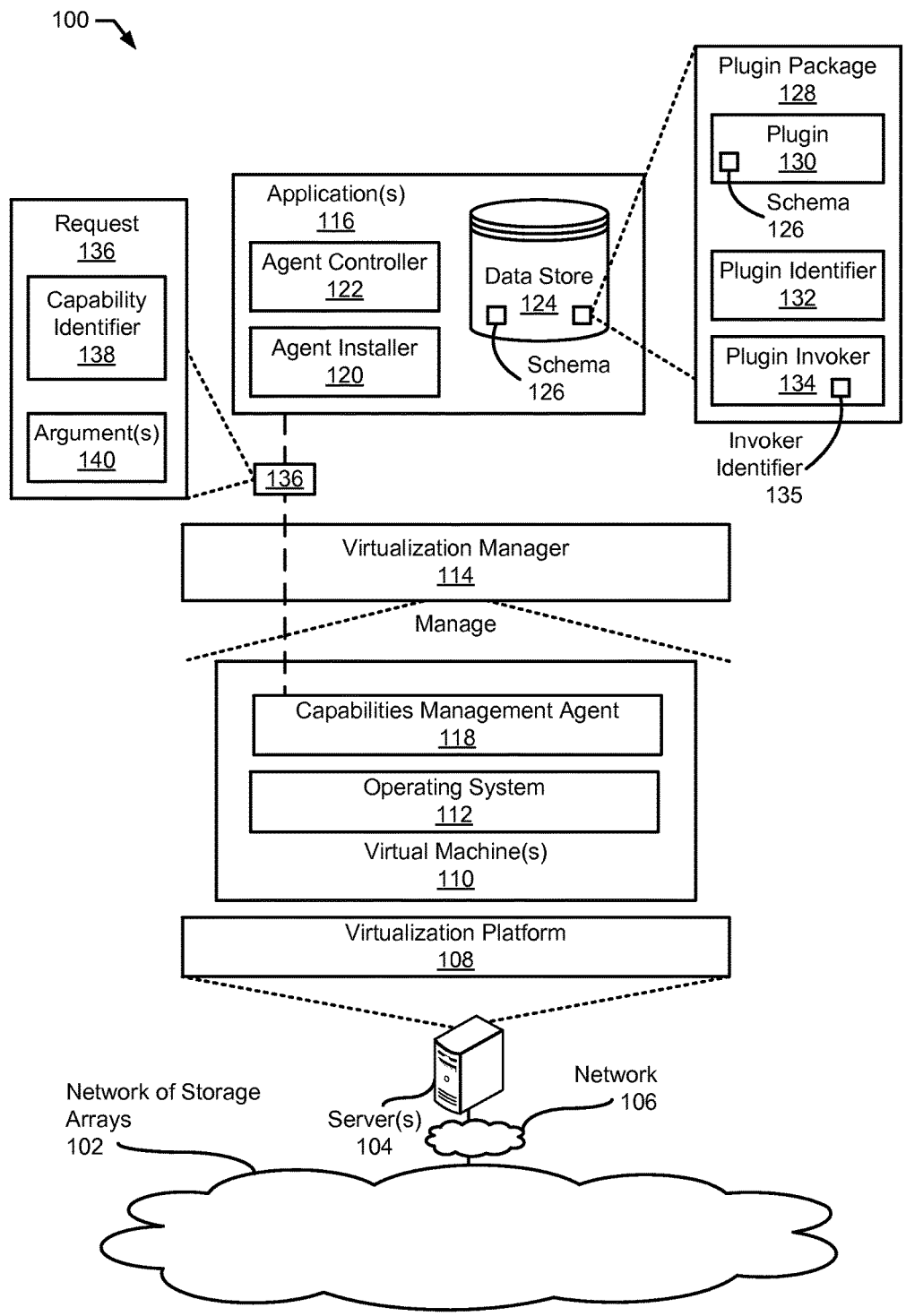
FIG. 1A is a block diagram of an example computing environment constructed in accordance with the teachings of this disclosure to facilitate management of capabilities using a common agent framework.

Examples disclosed herein facilitate a common agent framework to manage asset capabilities in an enterprise. For example, disclosed examples install a capabilities management agent on one or more asset(s) in the enterprise to enable one or more application(s) to securely and efficiently add, discover and/or invoke capabilities available at the asset. In addition, disclosed examples implement the common agent framework in a platform-agnostic and/or language-agnostic manner. For example, the capabilities management agent may invoke capabilities written in different languages (e.g., Java, python, C++, etc.) at the same time.

Virtual computing services enable one or more assets to be hosted within a computing environment. As disclosed herein, an asset is a computing resource (physical or virtual) that may host a wide variety of different applications such as, for example, an email server, a database server, a file server, a web server, etc. Example assets include physical hosts (e.g., non-virtual computing resources such as servers, processors, computers, etc.), virtual machines, containers that run on top of a host operating system without the need for a hypervisor or separate operating system, hypervisor kernel network interface modules, etc. In some examples, an asset may be referred to as a compute node, an end-point, a data computer end-node or as an addressable node.

Virtual machines operate with their own guest operating system on a host using resources of the host virtualized by virtualization software (e.g., a hypervisor, virtual machine monitor, etc.). Numerous virtual machines can run on a single computer or processor system in a logically separated environment (e.g., separated from one another). A virtual machine can execute instances of applications and/or programs separate from application and/or program instances executed by other virtual machines on the same computer.

In examples disclosed herein, containers are virtual constructs that run on top of a host operating system without the need for a hypervisor or a separate guest operating system. Containers can provide multiple execution environments within an operating system. Like virtual machines, containers also logically separate their contents (e.g., applications and/or programs) from one another, and numerous containers can run on a single computer or processor system. In some examples, utilizing containers, a host operating system uses namespaces to isolate containers from each other to provide operating-system level segregation of applications that operate within each of the different containers. This segregation can be viewed as a form of virtualization that isolates different groups of applications that operate in different containers. In some examples, such containers are more lightweight than virtual machines. In some examples, a container OS may execute as a guest OS in a virtual machine.

Management applications provide administrators visibility into the condition of assets in a computing environment (e.g., a data center). Administrators can inspect the assets, see the organizational relationships of a virtual application, filter log files, overlay events versus time, etc. In some examples, an application may install one or more plugins (sometimes referred to herein as "agents") at the asset to perform monitoring operations. For example, a first management application may install a first monitoring agent at an asset to track an inventory of physical resources and logical resources in a computing environment, a second management application may install a second monitoring agent at the asset to provide real-time log management of events, analytics, etc., and a third management application may install a third monitoring agent to provide operational views of trends, thresholds and/or analytics of the asset, etc. However, executing the different monitoring agents at the asset consumes resources (e.g., physical resources) allocated to the asset. In addition, some monitoring agents may perform one or more similar task(s).

Examples disclosed herein facilitate a common agent framework in a computing environment to enable management applications to securely and efficiently manage capabilities at the asset in the computing environment. For example, disclosed examples include a capabilities management agent installed on the asset to maintain a catalog of capabilities (sometimes referred to herein as a "schema" or a "set of capabilities") available at the asset.

In some disclosed examples, the example capabilities management agent facilitates adding capabilities (sometimes referred to herein as "functions," "tasks," "processes" or "operations") available at the asset. For example, in some disclosed examples, the example capabilities management agent registers plugin(s) provided by the management application in a plugins inventory. For example, the example capabilities management agent may record a plugin identifier (e.g., included in a plugin registration file) in the plugins inventory. In some examples, the plugin identifier may include a plugin namespace identifier, a plugin name identifier and a plugin version identifier.

In some disclosed examples, the plugin registration file also includes a reference to a plugin invoker (e.g., a file, a script, a program, etc.) associated with the plugin (sometimes referred to herein as a "provider" or a "capabilities provider"). In some examples, the example plugin invoker may facilitate executing the plugin. For example, when called by the example capabilities management agent, a plugin invoker may first load resources (e.g., a python library) that may be used by the plugin and then call the plugin (e.g., a plugin written in python) to execute.

In some disclosed examples, in response to registering the plugin in the example plugins inventory, the example capabilities management agent identifies one or more new capabilities made available by the plugin for executing. For example, the capabilities management agent may execute the plugin (e.g., by calling the associated plugin invoker) and request that the plugin provide a schema of functions describing a set of capabilities made available by the plugin. In some disclosed examples, the example capabilities management agent records the set of capabilities in a catalog of capabilities based on the identifiers of the capabilities in the set. As used herein, a capability identifier may include a class namespace, a class name, a class version and/or a capability name. A class (sometimes referred to as a "capability group") is a set of capabilities that may be identified by the same namespace, name and version.

In some disclosed examples, the capabilities management agent facilitates the management application discovering capabilities available to the asset by providing an updated catalog of capabilities to the management application. For example, when a new plugin is installed in the capabilities management agent at the asset, new capabilities (e.g., functions, tasks, processes, operations, etc.) are made available for executing. An example benefit of the capabilities management agent providing an updated catalog of capabilities to the management application is to enable the management application to determine whether to install their own plugin at the asset as the capabilities available at the asset change. For example, when a management application connects with the capabilities management agent, the management application may request that the example capabilities management agent provide the catalog of capabilities. In some disclosed examples, when the asset already has the resources to perform the functions required by the management application, the management application does not install a management application plugin at the asset, thereby enabling the asset to consume fewer of the resources allocated to the asset.

In some examples, the plugin may be a proactive plugin that continuously (or nearly continuously) executes at the asset. For example, a service level agreement (SLA) monitoring agent may continuously execute on the asset to determine if and/or when utilization of the asset violates an SLA. In some examples, the plugin may be a reactive plugin that responds (e.g., executes at the asset) when requested. For example, an agent installer plugin may respond (e.g., install an agent) when requested and remain idle otherwise, thereby conserving resources (e.g., processing power, memory, etc.) consumed at the asset. In some disclosed examples, the example capabilities management agent may limit resource utilization at the asset (e.g., by the installed plugins) by disabling proactive plugins. For example, while a plugin is performing a monitoring function (e.g., an SLA check), the example capabilities management agent may disable the proactive plugin.

In some disclosed examples, in response to a request, the example capabilities management agent uses a capability identifier included in the request to determine a particular plugin that is able to perform the requested task. For example, a management application may invoke a capability (e.g., request the capabilities management agent perform a capability) by providing the capability identifier and one or more argument(s) needed to perform the task to the example capabilities management agent. In some examples, the capabilities management agent queries the example catalog of capabilities for a plugin identifier that maps to the capability identifier. In some disclosed examples, the example capabilities management agent utilizes the plugin identifier to determine the plugin invoker to be used to execute the plugin. For example, the capabilities management agent may retrieve an invoker identifier from the plugins inventory. The example capabilities management agent may then call the plugin invoker by providing the plugin invoker the capability identifier and the argument(s). The example capabilities management agent may also provide a location to store the results of performing the task. For example, the plugin may record (e.g., log) output in an example results data store provided by the capabilities management agent.

FIG. 1A is a block diagram of an example computing environment 100 employing virtual machines and a hypervisor. The example computing environment 100 of FIG. 1A includes an example network of storage arrays 102 in communication with one or more example computing server(s) 104. The example network of storage arrays 102 may be implemented using any suitable wired and/or wireless storage including, for example, one or more Fiber Channel Storage Area Network (SAN) arrays, one or more Internet Small Computer System Interface (iSCSI) SAN arrays, one or more Network Attached Storage (NAS) arrays, etc. In the illustrated example, the network of storage arrays 102 are connected to and shared among groups of servers through an example network 106, thereby enabling aggregating storage resources and enabling increased flexibility in provisioning the storage resources to, for example, one or more example virtual machine(s) 110.

In the illustrated example of FIG. 1A, the example computing server(s) 104 may be implemented by any number of x86 or ARM (Acorn RISC Machine architecture) servers (e.g., one or more). The computing server(s) of the illustrated example are in communication with the example network of storage arrays 102 via the example network 106. While in the illustrated example the computing server(s) 104 are illustrated as a single server, the computing server(s) 104 may be implemented by any number (e.g., 1, 2, 3, etc.) and/or type(s) of servers. The example network 106 of FIG. 1A may be implemented using any suitable wired and/or wireless network(s) such as, for example, one or more data buses, one or more Local Area Networks (LANs), one or more wireless LANs, one or more cellular networks, the Internet, an Intranet, etc. As used herein, the phrase "in communication," and/or variations thereof, encompass direct communication and/or indirect communication through one or more intermediary components and do not require direct physical (e.g., wired) communication and/or constant communication, but rather additionally include selective communication at periodic or aperiodic intervals, as well as one-time events In the illustrated example of FIG. 1A, one or more of the example computing server(s) 104 executes an example virtualization platform 108. A virtualization platform (sometimes referred to as a "virtualization layer," a "hypervisor" or a "virtual machine monitor") abstracts processors, memory, storage and/or other resources of the computing environment into one or more virtual machines. In the illustrated examples, the virtual machine(s) 110 include an operating system 114 and/or execute one or more applications and/or services. In some examples, the virtualization platform 108 may be installed on a computing server without an intervening operating system (e.g., a bare-metal hypervisor). In some examples, the virtualization platform 108 may be installed on a storage device rather than on a computing server.

The example virtualization platform 108 of FIG. 1A virtualizes and aggregates the underlying physical hardware resources (e.g., some or all of the example network of storage arrays 102 and/or the example computing server(s) 104) across the physical computing environment and provides pools of virtual resources available for use in the computing environment 100. Thus, by using the resources available from the physical components of the computing environment 100, one or more of the example virtual machine(s) 110 may request resources dynamically as a workload increases, and/or may release resources dynamically as the workload decreases.

Figure 1B:
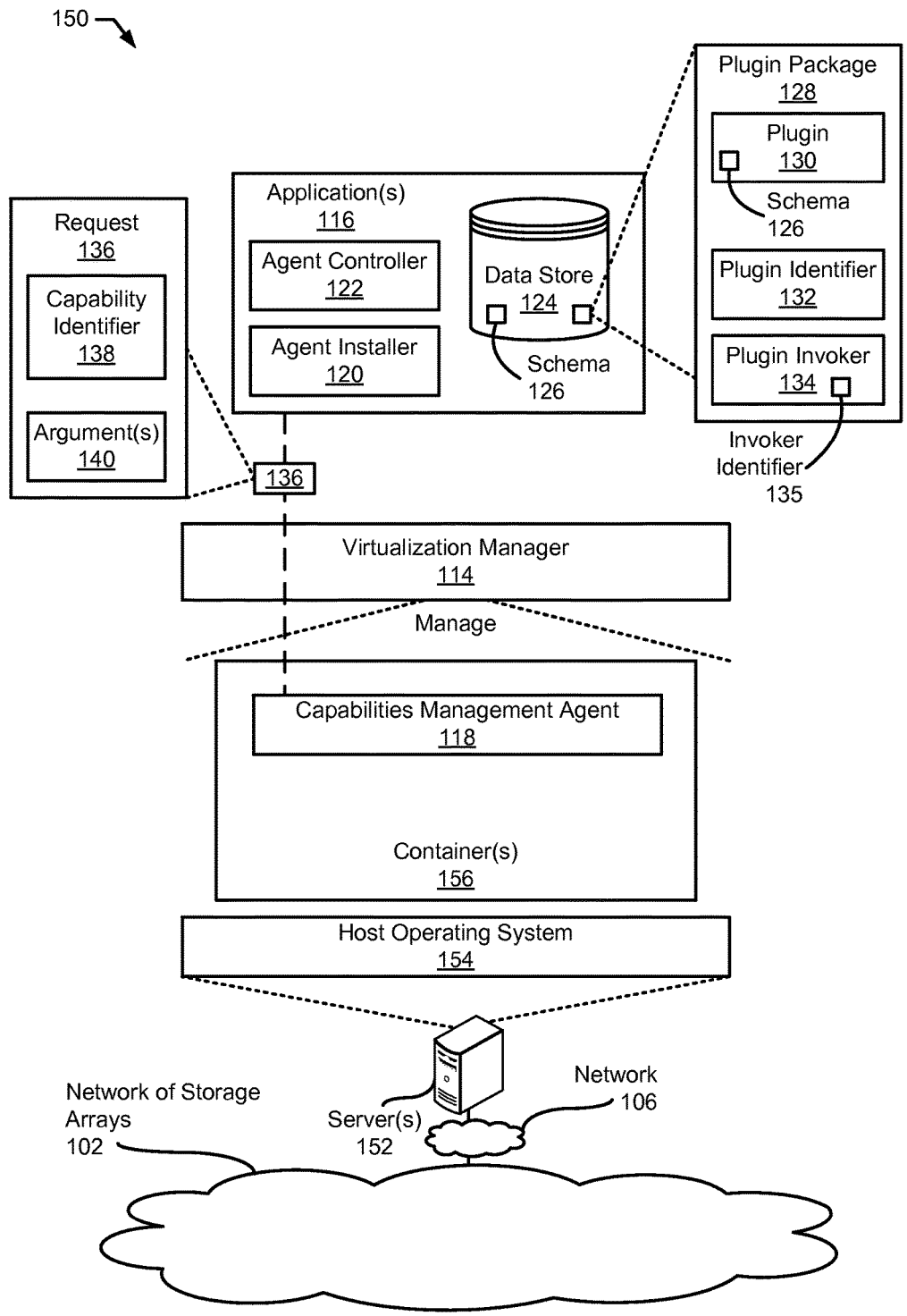
FIG. 1B is a block diagram of an alternate example computing environment constructed in accordance with the teachings of this disclosure to facilitate management of capabilities using a common agent framework.

In some examples disclosed herein, a lighter-weight virtualization is employed by eliminating the virtualization platform 108 and using containers in place of the virtual machine(s) 110. FIG. 1B is an example illustrating such a light-weight virtual computing environment 150. In the illustrated example of FIG. 1B, an example computing server 152 provides a host operating system 154. One or more example container(s) 156 of the example of FIG. 1B are software constructs that run on top of the host operating system 154 without the need for a virtualization platform or a separate guest operating system. Unlike virtual machines, the containers do not instantiate their own operating systems. Like virtual machines, the container(s) 156 are logically separate from one another. Numerous containers can run on a single computer or processor system. Also like virtual machines, the container(s) 156 can execute instances of applications or programs separate from application/program instances executed by the other containers on the same computer or processing system.

In some examples, the host operating system 154 uses namespaces to isolate the container(s) 156 from each other. Such an approach provides operating system level segregation of the different groups of applications that operate within the different container(s) 156. This segregation is akin to the virtual machine segregation that is offered in hypervisor-based virtualized environments, and thus can be viewed as a form of virtualization that isolates different groups of applications that operate in different containers. Other than the use of virtual machines and a hypervisor instead of containers running on a host OS, the example of FIGS. 1A and 1B are similar. Thus, the following discussion of like numbered components in FIG. 1A apply equally well to the like numbered parts of FIG. 1B and, to avoid redundancy, FIG. 1B will not be separately described.

Returning to the illustrated example of FIG. 1A, the example virtualization platform 108 has provisioned the virtual machine(s) 110. While in the illustrated example the virtual machine(s) 110 are illustrated as a single virtual machine, the virtual machine(s) 110 may represent any number of logical resources provisioned by the virtualization platform 108. The example virtualization platform 108 provisions the virtual machine(s) 110 and configures the respective virtual machine(s) 110 for operation in the computing environment 100. For example, the virtualization platform 108 may install and configure an example operating system 112 onto the virtual machine(s) 110.

In the illustrated example of FIG. 1A, to manage the computing environment 100, the example computing environment 100 of FIG. 1A includes an example virtualization manager 114. The example virtualization manager 114 provides a single point of control (or point of access) to the computing environment 100. In the illustrated example, the virtualization manager 114 manages the assignments of virtual machine(s) 110 to be virtualized on corresponding ones of the computing server(s) 104, and manages the assignments of resources of the computing server(s) 104 to the virtual machine(s) 110. In some examples, the virtualization manager 114 includes one or more interfaces (e.g., a web-access interface) that enable applications to manage the example computing environment 100 and access the example virtualization platform 108 and/or the example virtual machine(s) 110.

In the illustrated example of FIG. 1A, the example computing environment 100 includes one or more example application(s) 116 that interface with the virtualization manager 114 to manage and/or access the resources in the computing environment 100. In the illustrated example, the application 116 is a management application (e.g., vRealize, Log Insight™ and Hyperic®, vSphere®/vCenter™ manager, which are commercially available products from VMware®, Inc.) that performs monitoring operations to provide administrators visibility into the condition of the virtual machine(s) 110. As described above, in traditional architectures, when a management application is installed to monitor operations, the management application installs an agent at the virtual machine(s) being managed. These agents provide the functions (e.g., the monitoring operations or processes) that are required by the management application. This traditional architecture approach has several drawbacks. For instance, each application that is managing a virtual machine may install respective agent(s) on the virtual machine, which consumes resources (e.g., physical resources) allocated to the virtual machine. In addition, some functions provided by the agents may be redundant. For example, two management applications that provide analytics at the managed virtual machine may both install functions to monitor disk latency at the virtual machine.

In order to facilitate the common agent framework disclosed herein, the computing environment 100 of the illustrated example is provided with a capabilities management agent 118. For example, the virtualization platform 108 may install and configure the capabilities management agent 118 at the provisioned virtual machine(s) 110. The example capabilities management agent 118 maintains an example catalog of capabilities that are available at the virtual machine 110 based on plugins installed at the virtual machine 110. In some examples, when an application accesses the virtual machine 110, the capabilities management agent 118 provides the catalog of capabilities to the application, which may then determine whether to install an agent or, if the functionality is already available at the virtual machine 110, to not install an agent.

The example application 116 of the illustrated example of FIG. 1A includes an example agent installer 120, an example agent controller 122 and an example data store 124.

The example agent installer 120 of the illustrated example of FIG. 1A installs the functions (e.g., capabilities) required by the application 116 at the virtual machine 110. In the illustrated example, when the agent installer 120 accesses the virtual machine 110, the agent installer 120 requests that the virtual machine 110 provide a catalog of capabilities representing the functions installed at the virtual machine 110 and available to be invoked by the application 116. The example agent installer 120 of FIG. 1A compares the capabilities included in the catalog to a schema of functions 126 required by the application 116 be available at the virtual machine 110. For example, the agent installer 120 may retrieve the schema of functions 126 from the data store 124. In some examples, the schema of functions 126 represents a set of functions that may be invoked by the application 116. For example, the schema of functions 126 may be a list, a file, a database, etc.

In the illustrated example of FIG. 1A, when the agent installer 120 determines that the required function(s) are not already available at the virtual machine 110, the agent installer 120 provides an example plugin package 128 to the capabilities management agent 118 to install and make available the function(s) for invoking at the virtual machine 110. The example plugin package 128 of the illustrated example includes an example plugin 130 to provide the functions required by the application 116 and an example plugin identifier 132 to uniquely identify the plugin 130. For example, the plugin identifier 132 may include a plugin name, a plugin version and a plugin namespace. Such an approach provides developer level segregation of the different plugins that are installed at the virtual machine 110. As a result, two plugins installed at the virtual machine 110 may be differentiated based on their respective namespaces, their respective names and/or their respective version numbers. In some examples, the plugin identifier 132 may be included in a file (e.g., a plugin registration file), a list, as metadata in the plugin 130, etc. An example plugin registration file 300 is described in connection with FIG. 3.

The example common agent framework disclosed herein is platform-agnostic and language-agnostic. As disclosed herein, while plugin developers write their plugins in a particular language for a particular platform, the plugin developers can write the plugins in the particular language and/or platform of their choice. For example, plugin developers utilizing the techniques disclosed herein are not required to write their plugins in a specified language or for a specified platform. In addition, developers employing the common agent framework are not required to prepare specific versions of their plugins for different platforms and/or languages. For example, developers employing the common agent framework are able to use whichever language is most appropriate for a platform. For example, developers may develop a plugin for a Windows platform or a *nix platform in Java, python and/or C++. In other examples, developers that develop a plugin using the PowerShell language may be limited to the Windows platform.

In addition, application developers utilizing the techniques disclosed herein do not need to worry about the language and/or the platform for which a plugin was developed. As disclosed herein, by using a standard or common format for requests, responses and schema/catalogs, any application developer aware of a plugin can invoke plugin capabilities at a later time.

To enable this platform and language independence, the example plugin package 128 includes an example invoker 134 that operates as a translator to provide platform and language interoperability. For example, the example invoker 134 may be a shell script that enables an instruction received in C++ to be executed by a plugin written in python. In some examples, the example invoker 134 also provides resources that are needed by the plugin 130 to execute. For example, the invoker 134 may retrieve and/or load a language interpreter (e.g., Java, Python, Perl, etc.) that can be utilized by the plugin 130 during execution (e.g., when called). In the illustrated example of FIG. 1A, the example invoker 134 includes an example invoker identifier 135 that may be used to call the invoker 134.

As described below in connection with FIGS. 2 and 4, the example capabilities management agent 118 may read the plugin identifier 132 to determine the plugin invoker 134 to call. In some examples, the plugin invoker 134 prepares the language-specific path(s) (e.g., PYTHON_PATH, LD_LIBRARY_PATH) and calls the plugin in the language-specific manner. An implementation of an example plugin invoker 134 is described in connection with FIG. 4.

The example agent controller 122 of the illustrated example of FIG. 1A provides requests 136 to the capabilities management agent 118 to perform monitoring operations. For example, the agent controller 122 may instruct the capabilities management agent 118 to kill a process running at the virtual machine 110, to log resource utilization at the virtual machine 110, etc. In the illustrated example of FIG. 1A, the example request 136 includes a capability identifier 138 and one or more argument(s) 140 used by the corresponding capability. For example, to kill a process running at the virtual machine 110, the example request 136 may include a capability identifier 138 corresponding to the kill operation (e.g., "kill") and an argument 140 corresponding to the particular operation (e.g., "PID=1234"). In some examples, the capability identifier 138 may include a class (e.g., a namespace (e.g., "Application1"), a name (e.g., "process") and a version number (e.g., "1.0"). As used herein, a class represents a set of capabilities that are identified by the same namespace, same name and same version. For example, an example class (e.g., "Application1/process/1.0") may include a "kill" operation to kill a process and a "pause" operation to pause a process. Including a class in the capability identifier 138 may be useful in avoiding naming conflicts between different developers. For example, if two different developers want to implement a kill operation in different ways, the two developers may each name the capability "Kill" included in version "1.0" of a "Process" class, but there would not be a naming conflict because each "process" class would reside in a different namespace (e.g., "Application1" and "Application2"). An example implementation of the invoke request 500 is described in connection with FIG. 5.

In the illustrated example of FIG. 1A, the example request 136 does not include a plugin identifier. This approach may be useful if, for example, an application 116 can use a plugin that was previously installed by another application. That is, to the application 116, it does not matter which plugin executes their monitoring operations, but, rather, that the requested monitoring operation can be performed at the virtual machine 110. As described in connection with an example plugins monitor 245, the example plugins monitor 245 maintains a mapping between capabilities and the plugins that perform those capabilities. As a result, developers (e.g., application developers) do not need to worry about plugin names to call their functions. In addition, plugins may be used by applications that were unanticipated or unknown to developers at the time the developers developed the plugins. For example, by using a standard or common format for requests, responses and schema/catalogs, any developer aware of a plugin can invoke the plugin capabilities at a later time. In addition, by storing the outcomes in a standard or common format, different developers (e.g., application developers) may be able to utilize the outcomes already stored, for example, in the example data store 260, rather than re-executing the same functions.

The example data store 124 of FIG. 1A is provided to store the example schema of functions 126, the example plugin package 128 and/or any other information used by the application 116. The example data store 124 of FIG. 1A may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a nonvolatile memory (e.g., flash memory)). The example data store 124 may additionally or alternatively be implemented by one or more double data rate (DDR) memories, such as DDR, DDR2, DDR3, mobile DDR (mDDR), etc. The example data store 124 may additionally or alternatively be implemented by one or more mass storage devices such as hard drive disk(s), compact disk drive(s), digital versatile disk drive(s), etc. While, in the illustrated example, the example data store 124 is illustrated as a single database, the example data store 124 may be implemented by any number and/or type(s) of databases.

In operation, the example agent installer 120 receives a catalog of capabilities from the example capabilities management agent 118 that includes a set of capabilities that are available at the virtual machine 110. The example agent installer 120 retrieves the example schema of functions 126 from the example data store 124 and compares the functions in the catalog of capabilities to the functions included in the schema 126. In response to determining that the schema of functions 126 includes one or more function(s) that are not available at the virtual machine 110 (e.g., not included in the catalog of capabilities), the example agent installer 120 retrieves the plugin package 128 from the data store 124 and provides the plugin package 128, which includes the plugin 130 to provide the one or more identified function(s), the example plugin identifier 132 corresponding to the plugin 130 and the example plugin invoker 134 associated with the plugin 130, to the capabilities management agent 118.

In the illustrated example, the example agent controller 122, in response to a determination to invoke a capability at the capabilities management agent 118, provides the example request 136 to the capabilities management agent 118 to perform the capability. The request 136 includes the capability identifier 138, which includes a class namespace, a class name, a class version and/or a capability name. The example request 136 also includes one or more argument(s) 140 such a parameter (e.g., a variable name, a variable value, etc.) and/or attachment (e.g., a file). An example of an attachment is a capability that installs patches and an example attachment is a patch.

As an illustrative example, consider an example application 116 that performs compliance assessment (e.g., Security Content Automation Protocol (SCAP) compliance assessment) to determine if the virtual machine 110 satisfies one or more hardening standards such as the Health Insurance Portability and Accountability Act (HIPAA), Secure Technical Implementation Guides (STIGS) (provided by the Defense Information Securities Agency), vSphere Hardening Guide (VHG) (provided by VMware®, Inc.), etc. In some such examples, the application 116 may determine whether the virtual machine 110 is in compliance or compliance violation by invoking an "assess" capability at the virtual machine 110. In the illustrated example, the results of performing the "assess" capability are provided to the application 116 in the SCAP format and the application 116 is able to determine which, if any, rules are violated by the virtual machine 110. In some examples, if the application 116 discovers a compliance violation, the example application 116 may remediate the violation by invoking a capability at the virtual machine 110 (e.g., by applying a patch, by upgrading one or more capabilities available at the virtual machine 110, by downgrading one or more capabilities available at the virtual machine 110, etc.) via the example capabilities management agent 118 and, thereby, bringing the virtual machine 110 into near real-time and ongoing compliance. For example, if the virtual machine 110 is out of compliance because password rules at the virtual machine 110 are not stringent enough (e.g., do not satisfy a threshold), the application 116 may invoke a "changePasswordRule" capability at the virtual machine 110 to cause the capability management agent 118 to upgrade the password rules at the virtual machine 110.

While an example manner of implementing the application 116 is illustrated in FIGS. 1A and/or 1B, one or more of the elements, processes and/or devices illustrated in FIGS. 1A and/or 1B may be combined, divided, re-arranged, omitted, eliminated and/or implemented in any other way. Further, the example agent installer 120, the example agent controller 122, the example data store 124 and/or, more generally, the example application 116 of FIGS. 1A and/or 1B may be implemented by hardware, software, firmware and/or any combination of hardware, software and/or firmware. Thus, for example, any of the example agent installer 120, the example agent controller 122, the example data store 124 and/or, more generally, the example application 116 of FIGS. 1A and/or 1B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example agent installer 120, the example agent controller 122, the example data store 124 and/or, more generally, the example application 116 of FIGS. 1A and/or 1B is/are hereby expressly defined to include a tangible computer readable storage device or storage disk such as a memory, a digital versatile disk (DVD), a compact disk (CD), a Blu-ray disk, etc. storing the software and/or firmware. Further still, the example application 116 may include one or more elements, processes and/or devices in addition to, or instead of, those illustrated in FIGS. 1A and/or 1B, and/or may include more than one of any or all of the illustrated elements, processes and devices FIG. 2 is a block diagram of an example implementation of the example capabilities management agent 118 of FIGS. 1A and/or 1B constructed in accordance with the teachings of this disclosure. In the illustrated example of FIG. 2, the example capabilities management agent 118 includes an example messaging interface 205, an example security engine 210, an example package unpacker 215, an example plugins registrar 220, an example plugins repository 225, an example plugins inventory 230, an example invokers repository 235, an example plugins monitor 245, an example catalog 250, an example capabilities executor 255 and an example results data store 260.

Figure 2:
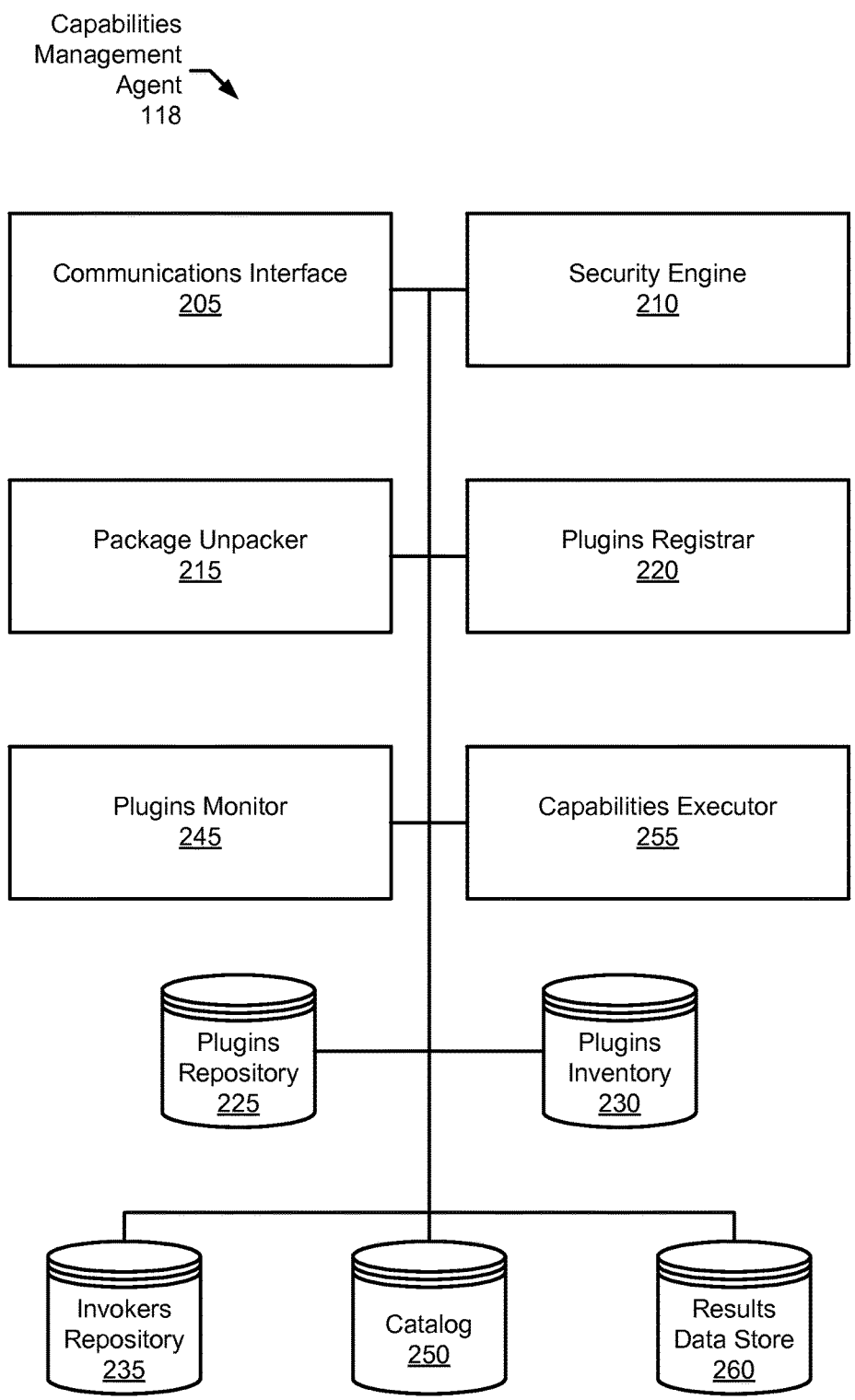
FIG. 2 is a block diagram of an example implementation of the example capabilities management agent of FIGS. 1A and/or 1B constructed in accordance with the teachings of the disclosure.

In the illustrated example of FIG. 2, the capabilities management agent 118 includes the example communications interface 205 to enable communication with the application(s) 116 of FIGS. 1A and/or 1B. For example, the communications interface 205 may facilitate bi-directional, asynchronous messaging between the capabilities management agent 118 and the application(s) 116. In the illustrated example, the communications interface 205 communicates with the application(s) 116 using Advanced Message Queueing Protocol (AMQP) communications. In some examples, the communications interface 205 may communicate with the application(s) 116 via a message broker such as a RabbitMQ server implementing AMQP. However, any other approach to communicate with and/or otherwise transmit and/or receive instructions and/or results to and/or from the application(s) 116 (e.g., Representational state transfer (REST) protocols, ZeroMQ (e.g., socket-based) communications, etc.) may additionally or alternatively be used.

In the illustrated example of FIG. 2, the capabilities management agent 118 includes the example security engine 210 to validate messages received and/or transmitted via the communications interface 205. The example security engine 210 of the illustrated example of FIG. 2 utilizes the Cryptographic Message Syntax (CMS) standard for protecting messages. However, any other approach to protect communications may additionally or alternatively be used. For example, the security engine 210 may use CMS to digitally sign, authenticate and/or encrypt/decrypt messages communicated between the application(s) 116 and the capability management agent 118. In the illustrated example, the security engine 210 encrypts and signs a message before the outgoing message is transmitted to the application(s) 116. The example security engine 210 of FIG. 2 also validates and decrypts messages received from the application(s) 116. In some examples, validation of the messages by the example security engine 210 may be useful to defend against man-in-the-middle attacks and/or other attempts to perform unauthorized actions.

In the illustrated example of FIG. 2, the example security engine 210 also authenticates the example plugin package 128 and/or the example plugin 130 before the plugin 130 is able to execute at the virtual machine 110. In the illustrated example, the security engine 210 utilizes the CMS standard for authenticating the plugin 130. For example, the security engine 210 may determine whether a security certificate of the plugin package 128 and/or the plugin 130 matches a corresponding security certificate available to the security engine 210. In response to the security engine 210 determining that the security certificates do not match, the security engine 210 of the illustrated example may prevent the plugin package 128 from installing and/or the plugin 130 from executing. In some examples, the security engine 210 may attempt to validate the plugin package 128 until a time-out event is detected or a threshold number of incorrect attempts is satisfied.

In some examples, the plugin 130 may be configured with permissions required to execute the plugin 130 at the virtual machine 110. For example, the security engine 210 may prevent a user from accessing the plugin 130 when the user does not have sufficient permissions (e.g., privileges). In the illustrated example of FIG. 2, the example security engine 205 utilizes VGAuth (a product from VMware®, Inc.) to control the permissions at which the plugin 130 can be executed. In the illustrated example, the security engine 210 utilizes the Security Assertion Markup Language (SAML) standard to authenticate and authorize access of a user to the plugin 130. For example, the security engine 210 may include an alias store that maps user names to one or more aliases. In the illustrated example, when the security engine 210 of FIG. 2 validates a user (e.g., by comparing a digital signature of the user specified in a SAML Token included in, for example, the request 136) with a security certificate), the security engine 210 enables the user to run at appropriate permissions. For example, requests submitted by an administrator may run as "root," while requests submitted by a developer may run as "guest."

An example benefit of such an approach (e.g., utilizing VGAuth to control the permissions at which plugins can be executed) is that administrators at the virtual machine 110 are in control of the permissions used on the virtual machine 110 that they administrators are responsible for maintaining, rather than always being permitted to run as a high-privileged user (e.g., "root"). Another example benefit of such an approach includes enabling an operating system (OS) to enforce authorization to OS resources. For example, if a plugin 130 is running as a low-privileged user (e.g., a "guest"), the OS will not let it kill a process owned by a high-privileged user.

In the illustrated example of FIG. 2, the example capabilities management agent 118 includes the example package unpacker 215 to unpackage (e.g., decompress) the example plugin package 128. For example, the application 116 may provide the plugin package 128 as a *.zip file, a *.tar file, an *.ogg file, a *.rpm file, etc. The example package unpacker 215 enables the capabilities management agent 118 to access different file types and not require only a single file type. For example, the package unpacker 215 may include and/or have access to one or more de-compression tools to decompress the plugin package 128 based on, for example, the file type of the plugin package 128. For example, if the package unpacker 215 determines that the plugin package 128 is a *.zip file, the example package unpacker 215 may call an "unzip" tool to decompress the plugin package 128. In some examples the developer (e.g., a plugin developer) includes an instruction stating which script is appropriate for the particular plugin package 128. The example package unpacker 215 of FIG. 2 provides decompressed components of the unpacked plugin package 128 (e.g., the plugin 130, the plugin identifier 132 and/or the plugin invoker 134) to the example plugins registrar 220.

In the illustrated example of FIG. 2, the example capabilities management agent 118 includes the example plugins registrar 220 to maintain a record of the plugins available (e.g., installed, loaded) to the capabilities management agent 118 (e.g., to invoke). In the illustrated example, the plugins registrar 220 parses the components of the plugin package 128 provided by the example package unpacker 215 and identifies the plugin 130, the plugin identifier 132 (e.g., a plugin registration file) and the plugin invoker 134. The example plugins registrar 220 of FIG. 2 stores identified plugins 130 in the example plugins repository 225.

In the illustrated example, the example plugins registrar 220 stores the plugin identifier 132 in the example plugins inventory 230. For example, the plugins registrar 220 may record a namespace identifier, a name identifier and a version identifier of the plugin 130 in the plugins inventory 230. In some examples, the plugins registrar 220 may log the plugin registration file 132 in the plugins inventory 230.

The example plugins registrar 220 stores the example plugin invoker 134 in an example invokers repository 235. In some examples, the plugins registrar 220 stores the plugin invoker 134 at a location provided by the application 116 (e.g., at the invoker identifier 135). For example, the plugins registrar 220 may parse the plugin registration file 132 and, in response to an invoker identifier 135 ("app1_process_1_0_0") identified in the plugin registration file 132, store the corresponding plugin invoker 134 in the invokers repository 235 (e.g., at a path location "invokers repository/app1_process_1_0_0"). The example plugins registrar 220 records the invoker identifier 135 with the corresponding plugin identifier 132 in the plugins inventory 230. An example data table 600 representing registered plugins is shown in FIG. 6.

In some examples, the plugins registrar 220 may discard (e.g., delete, uninstall, replace, etc.) a previous version of a plugin. As used herein, the version numbers follow the versioning rules where a change to a minor version represents that, although some code may have changed (e.g., to fix a bug), the application interface is still unchanged. In some such examples, if the application 116 updates a plugin to a new minor version (e.g., version 1.0.0 to version 1.0.1), the example plugins registrar 220 may replace the old plugin (e.g., version 1.0.0) with the new plugin (e.g., version 1.0.1). In contrast, a change to a major version represents a change to the application interface so that older versions cannot be understood by the new version. For example, if the application 116 updates a plugin to a new major version (e.g., version 1.0 to version 1.1), the example plugins registrar 220 will leave the old plugin (e.g., version 1.0) in the example plugins repository 225 and also install the new plugin (e.g., version 1.1) in the plugins repository 225.

The example plugins repository 225 of FIG. 2 is provided to store the example plugins 130 that are available to the capabilities management agent 118. The example plugins 130 may be retrieved from the example plugins repository 225 during execution (e.g., by the corresponding plugin invoker 134). The example plugins repository 225 of FIG. 2 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory)). The example plugins repository 225 may additionally or alternatively be implemented by one or more double data rate (DDR) memories, such as DDR, DDR2, DDR3, mobile DDR (mDDR), etc. The example plugins repository 225 may additionally or alternatively be implemented by one or more mass storage devices such as hard drive disk(s), compact disk drive(s), digital versatile disk drive(s), etc. While, in the illustrated example, the example plugins repository 225 is illustrated as a single database, the example plugins repository 225 may be implemented by any number and/or type(s) of databases.

The example plugins inventory 230 of FIG. 2 is provided to store the example plugin identifiers 132 and their corresponding invoker identifiers 135. The example plugins inventory 230 of FIG. 2 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory)). The example plugins inventory 230 may additionally or alternatively be implemented by one or more double data rate (DDR) memories, such as DDR, DDR2, DDR3, mobile DDR (mDDR), etc. The example plugins inventory 230 may additionally or alternatively be implemented by one or more mass storage devices such as hard drive disk(s), compact disk drive(s), digital versatile disk drive(s), etc. While, in the illustrated example, the example plugins inventory 230 is illustrated as a single database, the example plugins inventory 230 may be implemented by any number and/or type(s) of databases.

The example invokers repository 235 of FIG. 2 is provided to store the example plugin invokers 134 that are used to call their corresponding plugins 130. The example invokers repository 235 of FIG. 2 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory)). The example invokers repository 235 may additionally or alternatively be implemented by one or more double data rate (DDR) memories, such as DDR, DDR2, DDR3, mobile DDR (mDDR), etc. The example invokers repository 235 may additionally or alternatively be implemented by one or more mass storage devices such as hard drive disk(s), compact disk drive(s), digital versatile disk drive(s), etc. While, in the illustrated example, the example invokers repository 235 is illustrated as a single database, the example invokers repository 235 may be implemented by any number and/or type(s) of databases.

To maintain an accurate catalog of capabilities 250 available at the capabilities management agent 118, the example capabilities management agent 118 includes the example plugins monitor 245 to monitor the plugins inventory 230 for changes (e.g., additions or removals) to the plugins 130 available to the capabilities management agent 118. For example, an authorized application may bypass the plugins registrar 220 to store their plugin 130 in the plugins repository 225 and register their plugin 130 in the plugins inventory 230. In some such examples, the plugins registrar 220 may not be able to determine that a new plugin 130 and capabilities corresponding to the new plugin 130 are available to the capabilities management agent 118.

In the illustrated example of FIG. 2, the example plugins monitor 245 detects when a new plugin 130 is installed in the plugins inventory 230 via the capabilities management agent 118 (e.g., by the plugins registrar 220). In some examples, the example plugins monitor 245 may detect a plugin 130 that was not installed via the capabilities management agent 118. For example, a customer may use an Enterprise deployment tool to install the plugin 130 in the plugins repository 225. In some examples, a user may copy the plugin 130 onto the virtual machine 110 and install the plugin via a command-line instruction such as "rpm–i."

Figure 7:
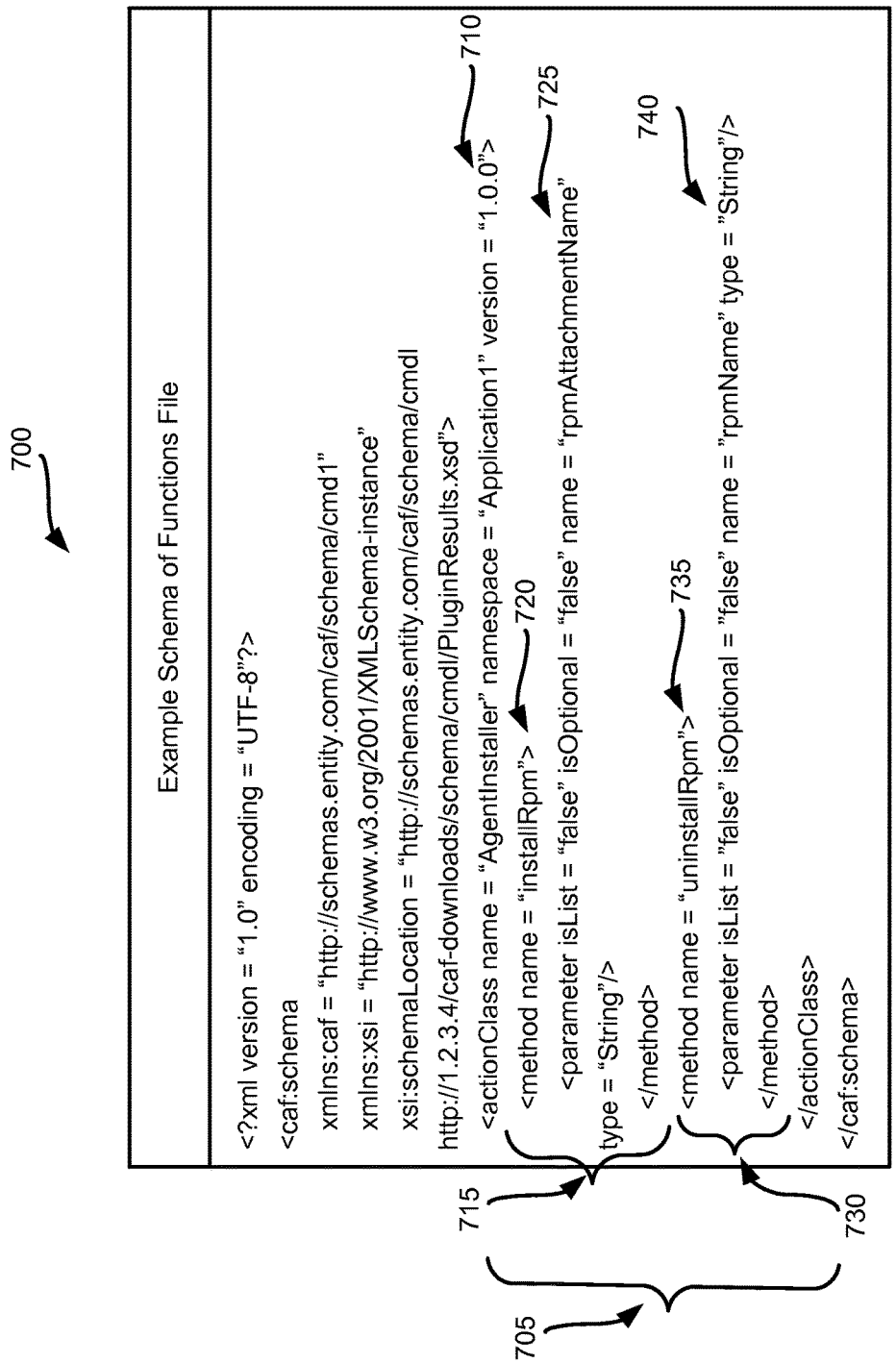
FIG. 7 illustrates an example schema of functions file that may be used by the example capabilities management agent of FIGS. 1A, 1B and/or 2 to determine the capabilities provided by the example plugin of FIGS. 1A and/or 1B.

In the illustrated example of FIG. 2, in response to detecting a new plugin 130 in the plugins inventory 230, the example plugins monitor 245 requests the new plugin 130 to identify the capabilities the plugin 130 is able to perform (e.g., provide the schema of functions 126). For example, the example plugins monitor 245 may retrieve the invoker identifier 135 from the plugins inventory 230 to call the corresponding plugin invoker 134. In the illustrated example of FIG. 2, the plugins monitor 245 records the retrieved capabilities in the example catalog of capabilities 250. An implementation of an example schema of functions 700 is shown in FIG. 7.

In the illustrated example, the example plugins monitor 245 of FIG. 2 also logs a mapping between the capabilities and their corresponding plugins 130 in the example catalog 250. As described above, when the example application 116 sends the request 136 for invoking a capability, the example request 136 of the illustrated examples of FIGS. 1A and/or 1B does not necessarily include a plugin identifier. Instead, the example plugins monitor 245 maintains a mapping to associate capabilities with particular plugins. For example, in response to a request to invoke a capability, the example plugins monitor 245 may utilize a mapping between the corresponding capability identifier and a plugin identifier to determine the available plugin 130 to perform the capability. An example data table 800 representing capabilities and their plugin mappings are shown in FIG. 8.

In some examples, the plugins monitor 245 provides the example catalog 250 to an application 116 in response to a capabilities request from the application 116. For example, when the application 116 connects with the example capabilities management agent 118, the example application 116 may request that the capabilities management agent 118 provide the example catalog 250. In some examples, the plugins monitor 245 provides updated catalogs 250 to the application(s) 116 in response to changes in the catalog 250. For example, when the application 116 uninstalls the plugin 130 from the virtual machine 110, the corresponding capabilities performed by the capabilities management agent 118 are removed from the catalog 250. In some such examples, the example plugins monitor 245 provides a new catalog 250 to the application(s) 116 accessing the capabilities management agent 118. In some such examples, the plugins monitor 245 enables the application(s) 116 to determine, in near real-time, whether they need to install their respective plugins 130. For example, depending on the capabilities included in the new catalog 250, an application 116 may determine to install plugin 130 for the application (e.g., the agent installer 120 may transmit the plugin package 128).

The example catalog of capabilities 250 is provided to store mappings between capabilities and their corresponding plugin. The example catalog of capabilities 250 of FIG. 2 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory)). The example catalog of capabilities 250 may additionally or alternatively be implemented by one or more double data rate (DDR) memories, such as DDR, DDR2, DDR3, mobile DDR (mDDR), etc. The example results catalog of capabilities 250 may additionally or alternatively be implemented by one or more mass storage devices such as hard drive disk(s), compact disk drive(s), digital versatile disk drive(s), etc. While, in the illustrated example, the example catalog of capabilities 250 is illustrated as a single database, the example catalog of capabilities 250 may be implemented by any number and/or type(s) of databases.

In the illustrated example of FIG. 2, the example capabilities management agent 118 includes the example capabilities executor 255 to facilitate executing capabilities at the virtual machine 110. As described above, the example request 136 to perform a capability includes the capability identifier 138 and one or more argument(s) 140 (e.g., one or more parameter(s) and/or attachment(s)) for executing the capability. In some examples, the request 136 may include an invoke request file requesting execution of one or more capabilities. An implementation of an example invoke request file 500 is described in connection with FIG. 5.

In the illustrated example, the capabilities executor 255 utilizes the capability identifier 138 to determine the corresponding plugin 130 capable of executing the capability. For example, the capabilities executor 255 may utilize the example catalog 250 (e.g., by querying the catalog 250, by retrieving information from the catalog 250, etc.) to map the capability identifier 138 to the corresponding plugin identifier 132. The example capabilities executor 255 of FIG. 2 uses the retrieved plugin identifier 132 to determine a plugin invoker 134 to call to execute the plugin 130. For example, the capabilities executor 255 may use the example plugins inventory 230 to map the plugin identifier 132 to the corresponding invoker identifier 135.

In the illustrated example, the capabilities executor 255 calls the plugin 130 to perform the requested capability. For example, the example capabilities executor 255 may use the invoker identifier 135 to call the plugin invoker 134 and provides the capability identifier 138, the argument(s) 140 and a location for the plugin 130 to store the outcome of executing the capability. In some examples, the capabilities executor 255 executes (e.g., calls) the plugin invoker 134 by passing command-line parameters indicating what tasks to perform (e.g., collect schema of functions, collect instances, invoke an operation, etc.), additional information (e.g., the argument(s) 140 passed to the plugin invoker 134 and the results directory. For example, the capabilities executor 255 may instruct the plugin 130 to store the outcome (e.g., results) of executing the capability in the example results data store 260.

In some examples, the results stored in the example results data store 260 are stored using a standard format. In some such examples, using a standard format enables the results stored in the results data store 260 to be accessed by other application(s) 116. For example, an application unknown to the developers of the requesting application 116 may also use the outcomes in the results data store 260.

The example results data store 260 is provided to store the results (e.g., outcomes) of executing capabilities. In the illustrated example, the results data store 260 is controlled by the example capabilities management agent 118 to ensure appropriate separation between requests, applications, etc. For example, the capabilities management agent 118 may separate the results in the results data store 260 based on clients (e.g., via a client identifier that uniquely identifies the application 116 that invoked the capability), asset (e.g., via a virtual machine identifier that uniquely identifies the virtual machine where the capability was invoked) and/or request (e.g., via a request identifier that unique identifies the request 136 that caused the capability to be invoked). The example results data store 260 of FIG. 2 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory)). The example results data store 260 may additionally or alternatively be implemented by one or more double data rate (DDR) memories, such as DDR, DDR2, DDR3, mobile DDR (mDDR), etc. The example results data store 260 may additionally or alternatively be implemented by one or more mass storage devices such as hard drive disk(s), compact disk drive(s), digital versatile disk drive(s), etc. While, in the illustrated example, the example results data store 260 is illustrated as a single database, the example results data store 260 may be implemented by any number and/or type(s) of databases.

In the illustrated example of FIG. 2, the example capabilities management agent 118 facilitates the application(s) 116 adding capabilities available to the virtual machine 110. In operation, the example communications interface 205 receives the example plugin package 128 to install the plugin 130 at the capabilities management agent 118. The example security engine 210 processes the plugin package 128 to validate the plugin package 128 and provides the validated plugin package 128 to the example package unpacker 215. The package unpacker 215 unpacks (e.g., decompresses) the validated plugin package 128 and provides the package components (e.g., the example plugin 130, the example plugin identifier 132 and the example plugin invoker 134) to the example plugins registrar 220. The plugins registrar 220 registers the package components by storing the plugin 130 in the example plugins repository 225 and storing the plugin invoker 134 in the example invokers repository 235. The example plugins registrar 220 also records the plugin identifier 132 and the corresponding invoker identifier 135 in the example plugins inventory 230. The example plugins monitor 245, in response to detecting a change in the plugins inventory 230, requests the new plugin 130 to provide a set of capabilities that it performs. The example plugins inventory 230 records the retrieved capabilities in the example catalog of capabilities 250. The example plugins monitor 245 also records a capability-plugin mapping in the catalog of capabilities 250.

In the illustrated example of FIG. 2, the example capabilities management agent 118 facilitates the application(s) 116 discovering capabilities available to the virtual machine 110. For example, in response to detecting a change in the catalog of capabilities 250, the example capabilities management agent 118 provides an updated listing of capabilities available at the capabilities management agent 118 to the one or more application(s) 116 in communication with the capabilities management agent 118. In operation, the example plugins monitor 245 retrieves the capability identifiers included in the catalog of capabilities 250. The example security engine 210 encrypts the retrieved capability identifiers and the communications interface 205 transmits the encrypted set of capabilities to the one or more application(s) 116 in communication with the capabilities management agent.

In the illustrated example of FIG. 2, the example capabilities management agent 118 facilitates the application(s) 116 invoking capabilities available to the virtual machine 110. In operation, the example communications interface 205 receives the example request 136 invoking a capability at the capabilities management agent 118. The example security engine 210 validates the request 136 and provides the validated request 136 to the example capabilities executor 255. The example capabilities executor 255 identifies the capability identifier 138 included in the request 136 and maps the capability identifier 138 to the corresponding plugin identifier 132 using the capability-plugins mappings in the catalog of capabilities 250. The example capabilities executor 255 determines the plugin invoker 134 associated with the plugin identifier 132 using the example registered plugins-invoker mappings in the example plugins inventory 230. The example capabilities executor 255 then calls the identified plugin invoker 134 and provides the capability identifier 138 and one or more argument(s) 140 (e.g., a parameter such as a process identifier (PID), an attachment such as a patch, etc.) needed to perform the capability to the plugin invoker 134. In the illustrated example, the output of the plugin 130 performing the capability is stored in the example results data store 260.

In some examples, the example plugins repository 225, the example plugins inventory 230, the example invokers repository 235, the example catalog of capabilities 250 and/or the example results data store 260 may be organized by the example plugins registrar 220 using a directory file structure. For example, the different plugin identifiers 132 included in the plugins inventory 230 may be stored in respective folders representing the different plugins 130 stored in the plugins repository 225 and the corresponding plugin invokers 134 stored in the invokers repository 235. The one or more capabilities that are provided by the corresponding plugins 130 may be stored in respective folders in the catalog of capabilities 250. The output(s) of performing the capabilities may be stored in respective folders in the results data store 260.

In some examples, the installed plugins 130 and their associated files and/or data may be encapsulated in respective folders and/or directories. For example, a first directory corresponding to a first plugin 130 may include a folder including the first plugin 130, a folder including the corresponding plugin identifier 132, a folder including the associated plugin invoker 134, a folder including the available capability identifiers 138 and a folder including the output of performing the respective capabilities.

In some examples, the plugin package 128 may be structured to include the respective folders (e.g., a folder including the plugin 130, a folder including the plugin identifier 132, a folder including the plugin invoker 134, a folder including the capability identifiers 138 and a folder to store the output of performing the respective capabilities). In some such examples, the application(s) 116 may add capabilities at the virtual machine 110 my providing the plugin package 128. The example application(s) 116 may discover the capabilities available at the virtual machine 110 by receiving one or more folder(s) including the capability identifiers 138 for the respective plugins 130 from the capabilities management agent 118. In addition, an application 116 can remove capabilities it provided to the capabilities management agent by uninstalling (e.g., deleting) the folder from the capabilities management agent 118.

While an example manner of implementing the capabilities management agent 118 of FIGS. 1A and/or 1B is illustrated in FIG. 2, one or more of the elements, processes and/or devices illustrated in FIG. 2 may be combined, divided, re-arranged, omitted, eliminated and/or implemented in any other way. Further, the example messaging interface 205, the example security engine 210, the example package unpacker 215, the example plugins registrar 220, the example plugins repository 225, the example plugins inventory 230, the example invokers repository 235, the example plugins monitor 245, the example catalog 250, the example capabilities executor 255, the example results data store 260 and/or, more generally, the example capabilities management agent 118 of FIGS. 1A and/or 1B may be implemented by hardware, software, firmware and/or any combination of hardware, software and/or firmware. Thus, for example, any of the example messaging interface 205, the example security engine 210, the example package unpacker 215, the example plugins registrar 220, the example plugins repository 225, the example plugins inventory 230, the example invokers repository 235, the example plugins monitor 245, the example catalog 250, the example capabilities executor 255, the example results data store 260 and/or, more generally, the example capabilities management agent 118 of FIGS. 1A and/or 1B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example messaging interface 205, the example security engine 210, the example package unpacker 215, the example plugins registrar 220, the example plugins repository 225, the example plugins inventory 230, the example invokers repository 235, the example plugins monitor 245, the example catalog 250, the example capabilities executor 255, the example results data store 260 and/or, more generally, the example capabilities management agent 118 of FIGS. 1A and/or 1B is/are hereby expressly defined to include a tangible computer readable storage device or storage disk such as a memory, a digital versatile disk (DVD), a compact disk (CD), a Blu-ray disk, etc. storing the software and/or firmware. Further still, the example capabilities management agent 118 of FIGS. 1A and/or 1B may include one or more elements, processes and/or devices in addition to, or instead of, those illustrated in FIG. 2, and/or may include more than one of any or all of the illustrated elements, processes and devices.

FIG. 3 illustrates an example plugin registration file 300 that may be used by the example capabilities management agent 118 of FIGS. 1A, 1B and/or 2 to register the example plugin 130. In some examples, the plugin registration file 300 is included in the example plugin package 128 of FIGS. 1A and/or 1B (e.g., the plugin identifier 132). The example provider registration file 300 of FIG. 3 includes an example plugin identifier section 305 and an example invoker identifier line 340. The example plugin identifier section 305 defines the plugin identifier 132 for the plugin 130. For example, the example plugin identifier section 305 includes an example first line 310 to define an example plugin namespace 315 for the plugin 130, an example second line 320 to define an example plugin name 325 for the plugin 130 and an example third line 330 to define an example plugin version number 335 for the plugin 130. In the illustrated example of FIG. 3, the plugin namespace 315 is a string data type that identifies an entity ("Entity1") that provided (e.g., developed, wrote, etc.) the plugin 130. However, other namespace identifiers may additionally or alternatively be used. For example, the plugin namespace 315 may identify the developers of the plugin 130 and/or the application that installs the plugin 130. The example plugin name 325 is a string data type that identifies a name ("AgentInstaller") for the plugin 130. The example plugin version number 330 is a string data type that identifies a version number ("1.0.0") corresponding to the plugin 130.

In the illustrated example of FIG. 3, the example invoker identifier line 340 defines an example invoker identifier 345 ("Entity1_AgentInstaller_1_0_0") used to call the example plugin invoker 134 (FIGS. 1A and/or 1B) associated with the plugin 130. In some examples, the invoker identifier 345 corresponds to a relative path location (e.g., "Entity1_AgentInstaller_1_0_0") to store the corresponding plugin invoker 134 at an absolute path location (e.g., "Invokers Repository/Entity1_AgentInstaller_1_0_0") in the example invokers repository 235.

FIG. 4 illustrates an example plugin invoker file 400 that may be used by the example capabilities management agent 118 of FIGS. 1A, 1B and/or 2 to invoke the example plugin 130 of FIGS. 1A and/or 1B. In some examples, the plugin invoker file 400 is included in the example plugin package 128 provided by the application 116 of FIGS. 1A and/or 1B to the capabilities management agent 118 of FIGS. 1A, 1B and/or 2. In some examples, the plugin invoker file 400 may be executed by the capabilities management agent 118 to initiate the corresponding plugin 130. In the illustrated example of FIG. 4, the example plugin invoker file 400 includes an example execution setup line 405 that identifies one or more libraries to load for executing the plugin 130 (e.g., PYTHON_PATH, LD_LIBRARY_PATH). The example plugin invoker file 400 also includes an example language setup line 410 to load a language in which the plugin 130 is written (e.g., python). The example plugin invoker file 400 also includes an example plugin calling line 415 to call the plugin 130 in a language specific manner. As described above, in some examples, when the capabilities management agent 118 invokes the plugin invoker 134, the capabilities management agent 118 provides the argument(s) 140 and a specific output directory (e.g., the example results data store 260) to store the output.

FIG. 5 illustrates an example invoke request file 500 that may be executed by the example capabilities management agent 118 of FIGS. 1A, 1B and/or 2 to invoke a capability (e.g., functions, tasks, processes, operations, etc.). In some examples, the invoke request file 500 may be provided by the application 116 in the example request 136. In some examples, the example agent controller 122 provides the invoke request file 500 to the capabilities management agent 118 to invoke a capabilities. In the illustrated example, the invoke request file 500 includes an example capability identifier section 505 and example arguments identifier section 535.

The example capability identifier section 505 defines the capability identifier 138 being invoked. For example, the example capability identifier section 505 includes an example first line 510 to define an example class including an example class namespace 515 (e.g., "Application1"), an example class name 520 (e.g., "AppAgent") and an example class version number 525 (e.g., "1.0.0"). In the illustrated example of FIG. 5, the example class namespace 515 identifies an entity ("Application1") that provided (e.g., developed, wrote, etc.) the capabilities included in the class. However, other namespace identifiers may additionally or alternatively be used. For example, the class namespace 515 may identify the developers of the capabilities and/or the plugin 130, and/or the application that installs the plugin 130. The example class name 520 ("AppAgent") identifies a name for the class. The example class version number 525 ("1.0.0") identifies a version number corresponding to the class. The example capability identifier section 505 includes an example second line 530 to define example capability 531 (e.g., "installRpm") being invoked in the request.

The example arguments identifier section 535 defines the arguments 140 used in executing the capability 531. The example arguments identifier section 535 of FIG. 5 includes an example parameter name 540 (e.g., "rpmAttachmentName"), an example parameter data type 545 (e.g., "String") and an example parameter value (e.g., "rpmAttachment").

Accordingly, the example invoke request file 500 of FIG. 5 is used to request that the capabilities management agent 118 execute an "installRpm" capability 531 that is included in the "Application1/AppAgent/1.0.0" class. In addition, to execute the "installRpm" capability 531, the example invoke request file 500 provides the "string" type value ("rpmAttachment") of the "rpmAttachmentName" parameter. In other words, the example invoke request file 500 of FIG. 5, when executed, installs the rpm entitled "rpmAttachment."

FIG. 6 illustrates an example data table 600 that may be employed by the example plugins registrar 220 of FIG. 2 to store registered plugins-invoker mappings. For example, the example plugins registrar 220 may record the plugin identifier 132 and the invoker identifier 135 in the example plugins inventory 230. In the illustrated example of FIG. 6, the plugin identifier 132 includes an example plugin namespace, an example plugin name and an example plugin version number. The example data table 600 may be utilized by the example capabilities management agent 118 to determine the plugin invoker 134 to call to execute the corresponding plugin 130. For example, in response to determining to execute a particular plugin 130 to perform a capability, the example capabilities management agent 118 may use the registered plugins-invoker mapping of the data table 600 to determine the corresponding plugin invoker to call.

The example data table 600 includes an example plugin namespace identifier column 605, an example plugin name identifier column 610, an example plugin version identifier column 615 and an example plugin invoker identifier column 620. In the illustrated example, the example plugin identifier columns 605, 610, 615 uniquely identify the plugin 130. For example, two plugins may differ in their plugin namespace, their plugin name and/or their plugin version. The example plugin namespace identifier column 605 indicates, for example, an entity that developed the plugin 130. The example plugin name identifier column 610 indicates a name of the plugin 130. The example plugin version identifier column 615 indicates a version number of the plugin 130. The example plugin invoker identifier column 620 indicates the example invoker identifier 135 that is called to execute the plugin 130. However, any other columns representing any other conditions and/or characteristics of the plugin 130 may additionally or alternatively be used. Moreover, the example column(s) of the example data table 600 may be implemented in any other fashion (e.g., using a different data structure).

The example data table 600 of the illustrated example of FIG. 6 includes three example rows 650, 655, 660 corresponding to three different plugins registered by the example plugins registrar 220. The example first row 650 indicates that version "1.0.0" of an "AgentInstaller" plugin is installed at the capabilities management agent 118 and that the plugin ("AgentInstaller") is associated with an "Entity1." The example first row 650 also indicates that the example capabilities executor 255 is to call the plugin invoker ("Entity1_Agent_Installer_1_0_0") to execute the plugin identified in the example first row 650.

The example second row 655 indicates that version "1.3.5" of a "LatencyMonitor" plugin is installed at the capabilities management agent 118 and that the plugin ("LatencyMonitor") is associated with an "Application2." The example second row 655 also indicates that the example capabilities executor 255 is to call the plugin invoker ("App2_Latency_Monitor_1_3_5") to execute the plugin identified in the example second row 655.

The example third row 660 indicates that version "1.0.0" of an "AgentInstaller" plugin is installed at the capabilities management agent 118 and that the plugin ("AgentInstaller") is associated with an "Application2." The example third row 660 also indicates that the example capabilities executor 255 is to call the plugin invoker ("App2_Agent_Installer_1_0_0") to execute the plugin identified in the example third row 660.

The example data table 600 of FIG. 6 illustrates that using the plugin namespace may be useful in limiting naming conflicts between, for example, unrelated developers. For example, if two developers want a plugin to install agents in different ways, the two developers may each name the plugin "AgentInstaller" with a plugin version "1.0.0," but there would not be a naming conflict because each plugin ("AgentInstaller") would reside in a different plugin namespace (e.g., "Entity1" and "Application2").

FIG. 7 implements an example schema of functions file 700 that may be used by the example capabilities management agent 118 of FIGS. 1A, 1B and/or 2 to determine the capabilities provided by the example plugin 130 of FIGS. 1A and/or 1B. In some examples, the example schema of functions file 700 may be included in the plugin package 128 (e.g., provided as the example schema of functions 126) and/or generated by the example plugin 130 in response to a request by the example plugins monitor 245 of FIG. 2. The example schema of functions file 700 includes a capabilities identifier that identifies the class to which the capabilities belong, and the one or more attachment(s) needed to perform the capability.

The example schema of functions file 700 of FIG. 7 includes an example capabilities definition section 705 that provides the capability identifier 138 and the argument(s) 140 needed to execute the corresponding capability. The example capabilities definition section 705 includes a first line 710 that defines the class to which the capabilities in the capabilities definition section 705 belong. For example, in the illustrated example, the capabilities are included in a class identified by the class namespace ("Application1"), the class name ("AgentInstaller") and the version number ("1.0.0").

In the illustrated example, the class identified in the example first line 710 (e.g., "Application1/AgentInstaller/1.0.0") includes two capabilities (e.g., example capabilities sections 715, 730). For example, a second example line 720 indicates the first capability name (e.g., "installRpm") and a third example line 725 indicates the argument(s) required to execute the corresponding capability (e.g., a "string" data type value for an "rpmAttachmentName" variable). An example fifth example line 735 indicates the second capability (e.g., "uninstallRpm") and a sixth example line 740 indicates the arguments required to execute the second capability (e.g., a "string" data type value for an "rpmName" variable).

FIG. 8 illustrates an example data table 800 that may be employed by the example capabilities management agent 118 of FIGS. 1A, 1B and/or 2 to store capability-plugin mappings. For example, the example plugins monitor 245 of FIG. 2 may record the capability identifier 138 and the plugin identifier 132 corresponding to the plugin 130 to execute the capability. In the illustrated example of FIG. 8, the capability identifiers 138 include an example class namespace, an example class name, an example class version number and an example capability name. The plugin identifiers 132 of FIG. 8 include an example plugin namespace, an example plugin name and an example plugin version number. The example data table 800 may be utilized by the example capabilities management agent 118 to determine the plugin 130 (e.g., based on the corresponding plugin identifier 132) associated with the respective capabilities. For example, in response to identifying a capability to perform, the example capabilities management agent 118 may use the capability-plugin mappings of the data table 800 to determine the plugin identifier corresponding to the plugin to perform the capability.

The example data table 800 includes an example class namespace identifier column 805, an example class name identifier column 810, an example class version identifier column 815, an example capability identifier column 820, an example plugin namespace identifier column 825, an example plugin name identifier column 830 and an example plugin version identifier column 835. In the illustrated example, the example capability identifier columns 805, 810, 815, 820 uniquely provide the capability identifier 138. In addition, the example plugin identifier columns 825, 830, 835 uniquely identify the plugin identifier 132.

In the illustrated example of FIG. 8, the example class namespace identifier column 805 and the plugin namespace identifier 825 may identify the developers of the capabilities and/or the plugin 130, and/or the application that installs the plugin 130. The example class name identifier column 810 identifies a name for the class. The example class version identifier column 815 identifies a version number corresponding to the class. The example capability identifier column 820 identifies the capability name. The example plugin name identifier column 830 indicates the name of the plugin 130. The example plugin version identifier column 835 indicates a version number of the plugin 130. However, any other columns representing any other conditions and/or characteristics of the capability and/or the plugin 130 may additionally or alternatively be used. Moreover, the example column(s) of the example data table 800 may be implemented in any other fashion (e.g., using a different data structure).

The example data table 800 of the illustrated example of FIG. 8 includes three example rows 850, 855, 860 corresponding to three different capability-plugin mappings stored in the example catalog 250 of FIG. 2. The example first row 850 indicates that the "Entity1/AppAgent/1.0.0/installRpm" capability maps to the "Entity1/AgentInstaller/1.0.0" plugin. That is, the example first row 850 indicates that the "Entity1/AgentInstaller/1.0.0" plugin performs the "Entity1/AppAgent/1.0.0/installRpm" capability.

The example second row 855 indicates that the "Entity1/AppAgent/1.0.0/uninstallRpm" capability maps to the "Entity1/AgentInstaller/1.0.0" plugin. That is, the example second row 855 indicates that the "Entity1/AgentInstaller/1.0.0" plugin performs the "Entity1/AppAgent/1.0.0/uninstallRpm" capability.

The example third row 860 indicates that the "Application2/MonitorAgent/1.0.0/SLACheck" capability maps to the "Application2/LatencyMonitor/1.3.5" plugin. That is, the example third row 860 indicates that the "Application2/LatencyMonitor/1.3.5" plugin performs the "Application2/MonitorAgent/1.0.0/SLACheck" capability.

Figure 9:
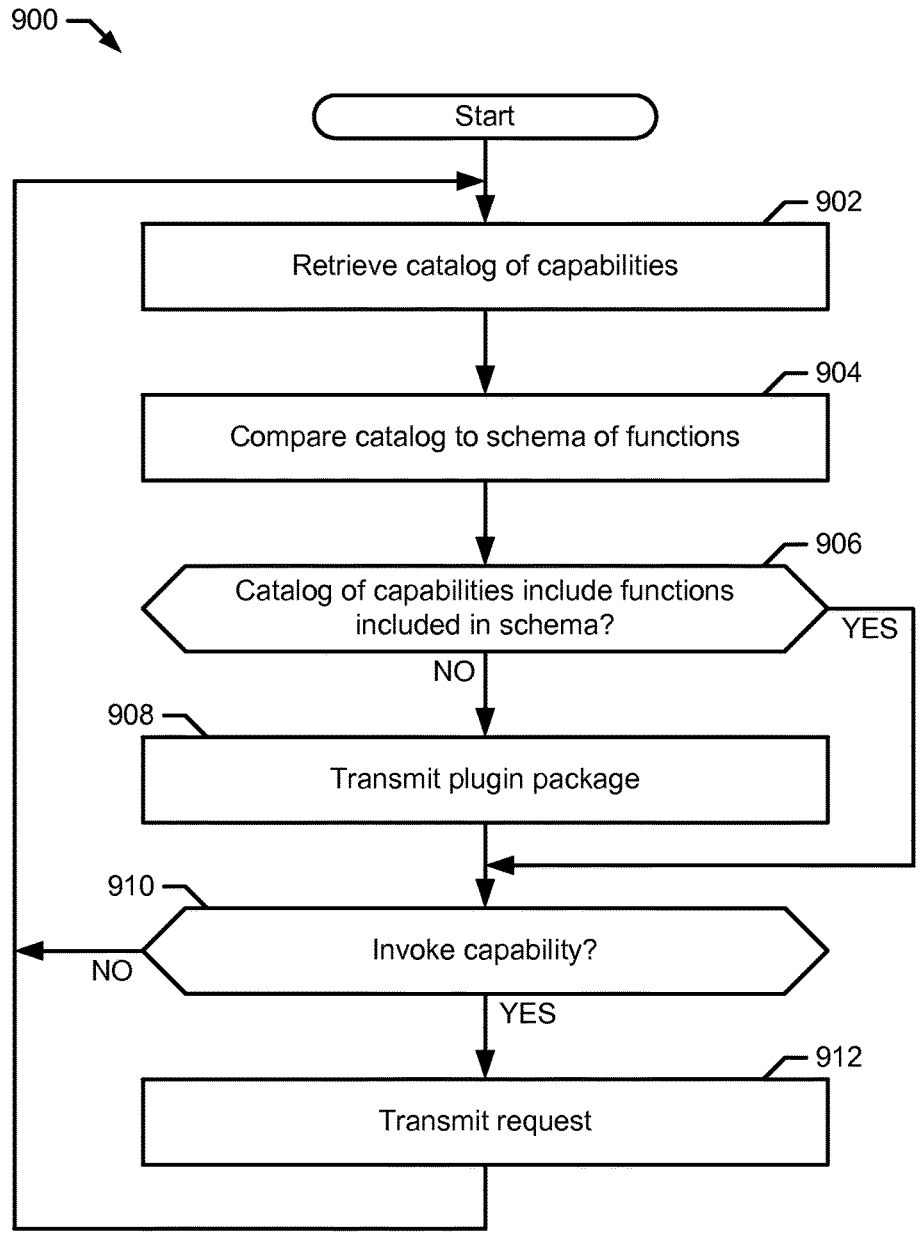
FIG. 9 is a flowchart representative of example machine-readable instructions that may be executed to implement the example application of FIGS. 1A and/or 1B.

A flowchart representative of example machine readable instructions for implementing the application 116 of FIGS. 1A and/or 1B is shown in FIG. 9. In this example, the machine readable instructions comprise a program for execution by a processor such as the processor 1212 shown in the example processor platform 1200 discussed below in connection with FIG. 12. The programs may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIG. 9, many other methods of implementing the example application 116 may alternatively be used. For example, the order of execution of the blocks may be changed, and/or some of the blocks described may be changed, eliminated, or combined.

FIG. 9 is a flowchart representative of example machine-readable instructions 900 that may be executed to implement the example application 116 of FIGS. 1A and/or 1B. The example instructions 900 of the illustrated example of FIG. 9 begin at block 902 when the application 116 retrieves the catalog of capabilities 250. For example, the example agent installer 120 may request the example capabilities management agent 118 provide the example catalog of capabilities 250. The example agent installer 120 may retrieve the catalog of capabilities 250 periodically (e.g., once a minute, once an hour, etc.), aperiodically (e.g., in response to the capabilities management agent 118 detecting a change in the catalog of capabilities 250) and/or as a one-time event (e.g., upon establishing connection with the capabilities management agent 118).

At block 904, the example agent installer 120 compares the catalog of capabilities 250, which represents the set of capabilities available at the capabilities management agent 118, to the example schema of functions 126, which represents the set of capabilities performed by the application 116. If, at block 906, the example agent installer 120 determined that the catalog of capabilities 250 does not include the functions included in the schema of functions 126 (e.g., that the capabilities management agent 118 is unable to execute the capabilities performed by the application 116), then, at block 908, the agent installer 120 provides the functionality to the capabilities management agent 118. For example, the agent installer 120 may retrieve the example plugin package 128 from the example data store 124 to transmit the example plugin package 128 to the capabilities management agent 118.

At block 910, the example application 116 determines whether to invoke a capability at the capabilities management agent 118. For example, the agent controller 122 may instruct the capabilities management agent 118 to execute a monitoring operation. If, at block 910, the example agent controller 122 determined not to invoke a capability, control returns to block 902 to retrieve the catalog of capabilities 250.

If, at block 910, the example agent controller 122 determined to invoke a capability at the capabilities management agent 118, then, at block 912, the agent controller 122 transmits a request 136 to the capabilities management agent 118 to invoke a capability. For example, the agent controller 122 may provide the capabilities management agent 118 the capability identifier 138 (e.g., a class namespace, a class name, a class version and/or a capability name) and the argument(s) 140 to execute the corresponding capability. Control then returns to block 902 to retrieve the catalog of capabilities 250.

Figure 10:
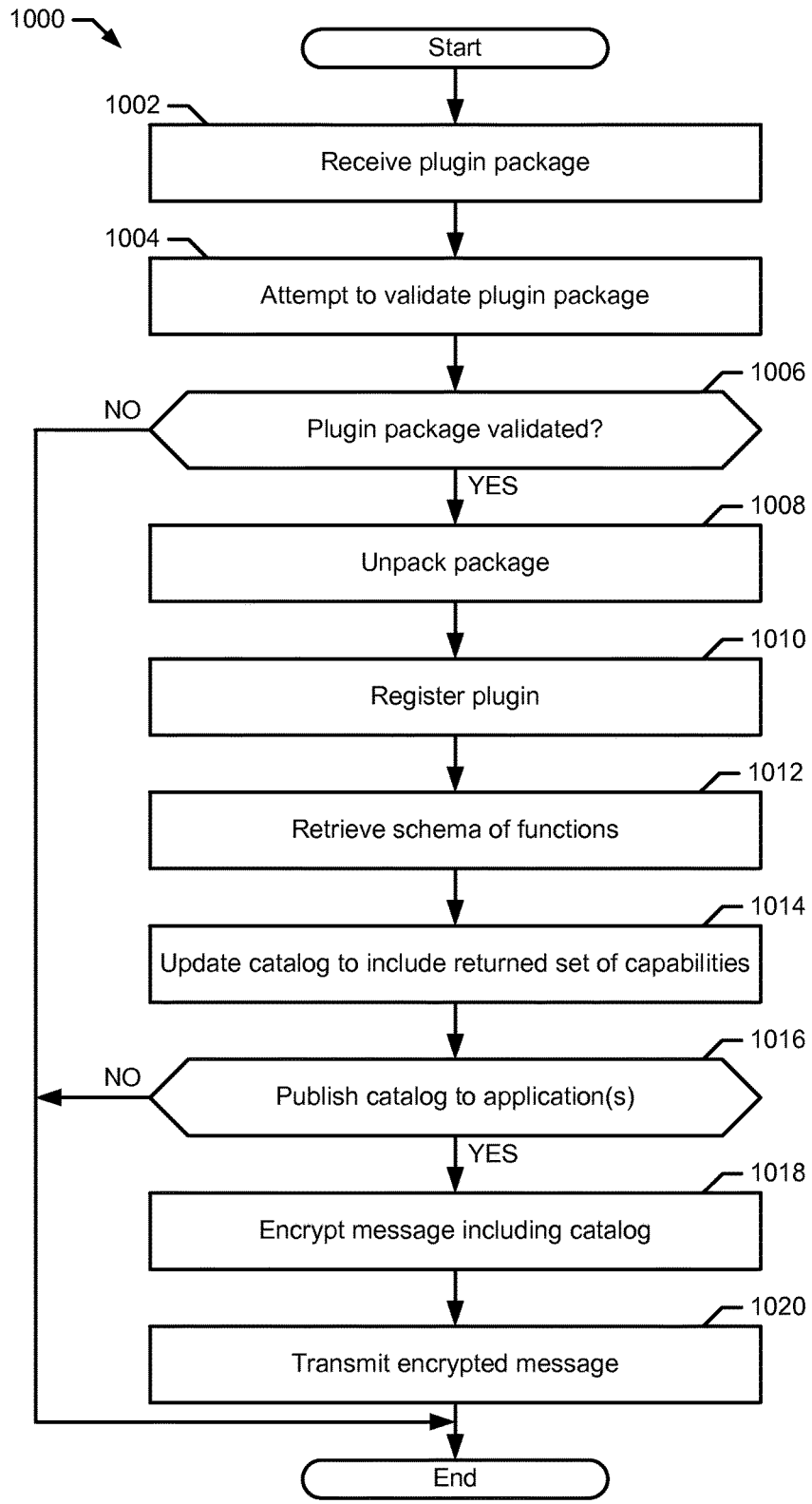
FIGS. 10 and 11 are flowcharts representative of example machine-readable instructions that may be executed to implement the example capabilities management agent of FIGS. 1A and/or 1B.

Flowcharts representative of example machine readable instructions for implementing the capabilities management agent 118 of FIGS. 1A, 1B and/or 2 are shown in FIGS. 10 and/or 11. In these examples, the machine readable instructions comprise a program for execution by a processor such as the processor 1312 shown in the example processor platform 1300 discussed below in connection with FIG. 13. The programs may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example programs are described with reference to the flowcharts illustrated in FIGS. 10 and/or 11, many other methods of implementing the example capabilities management agent 118 may alternatively be used. For example, the order of execution of the blocks may be changed, and/or some of the blocks described may be changed, eliminated, or combined.

As mentioned above, the example processes of FIG. 9 and/or FIGS. 10 and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 9 and/or FIGS. 10 and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. "Comprising" and all other variants of "comprise" are expressly defined to be open-ended terms. "Including" and all other variants of "include" are also defined to be open-ended terms. In contrast, the term "consisting" and/or other forms of "consist" are defined to be close-ended terms.

FIG. 10 is a flowchart representative of example machine-readable instructions 1000 that may be executed to implement the example capabilities management agent 118 of FIGS. 1A, 1B and/or 2 to add capabilities available to the example virtual machine(s) 110 in the computing environment 100. The example instructions 1000 of the illustrated example of FIG. 10 begin at block 1002 when the capabilities management agent 118 receives the example plugin package 128 from the example application 116. For example, the example communications interface 205 may receive, using AMQP communications, the plugin package 128 including the example plugin 130, the example plugin identifier 132 and the example plugin invoker 134. At block 1004, the security engine 210 attempts to validate the plugin package 128. For example, the security engine 210 may utilize CMS standards to validate and decrypt the plugin package 128. If, at block 1006, the security engine 210 determined it was unable to validate the plugin package 128, the example program 1000 of FIG. 10 ends. In some examples, the security engine 210 may attempt to validate the plugin package 128 until a time-out event is detected or a threshold number of incorrect attempts is satisfied.

If, at block 1006, the security engine 210 was able to validate the plugin package 128, then, at block 1008, the example package unpacker 215 unpacks the plugin package 128. For example, the package unpacker 215 may execute an install script included in the plugin package 128 by the application 116. At block 1010, the example plugin registrar 220 registers the plugin 130. For example, the plugin registrar 220 may store the plugin 130 in the example plugins repository 225 and the example plugin invoker 134 in the example invokers repository 235. The example plugin registrar 220 also logs the plugin identifier 132 and the corresponding invoker identifier 135 in the example plugins inventory 230.

At block 1012, the example plugins monitor 245 retrieves the example schema of functions 126 from the plugin 130. For example, in response to detecting a change in the plugins inventory 235, the plugins monitor 245 may query the plugin 130 for the schema of functions 126 (e.g., by calling the plugin invoker 134). At block 1014, the example plugins monitor 245 updates the example catalog of capabilities 250 to include the returned set of functions (e.g., the functions included in the schema of functions 126). In some examples, the plugin 130 records the schema of functions 126 in the catalog of capabilities 250. At block 1016, the example plugins monitor 245 determines whether to publish the updated catalog of capabilities 250. For example, the capabilities management agent 118 may provide the catalog of capabilities 250 to the application(s) 116 when the plugins monitor 245 detects a change in the catalog of capabilities 250. If, at block 1016, the example plugins monitor 245 determined not to publish the updated catalog of capabilities 250, the example program 1000 of FIG. 10 ends.

If, at block 1016, the example plugins monitor 245 determined to publish the updated catalog of capabilities 250, then at block 1018, the example security engine 210 encrypts a message including the updated catalog of capabilities 250 for transmitting to the example application(s) 116. For example, the security engine 210 may encrypt the message using the CMS standard for protecting messages. At block 1020, the example capabilities management agent 118 transmits the encrypted message. For example, the example communications interface 205 may transmit the encrypted message to the application(s) 116 using AMQP communications. The example program 1000 of FIG. 10 ends.

Figure 11:
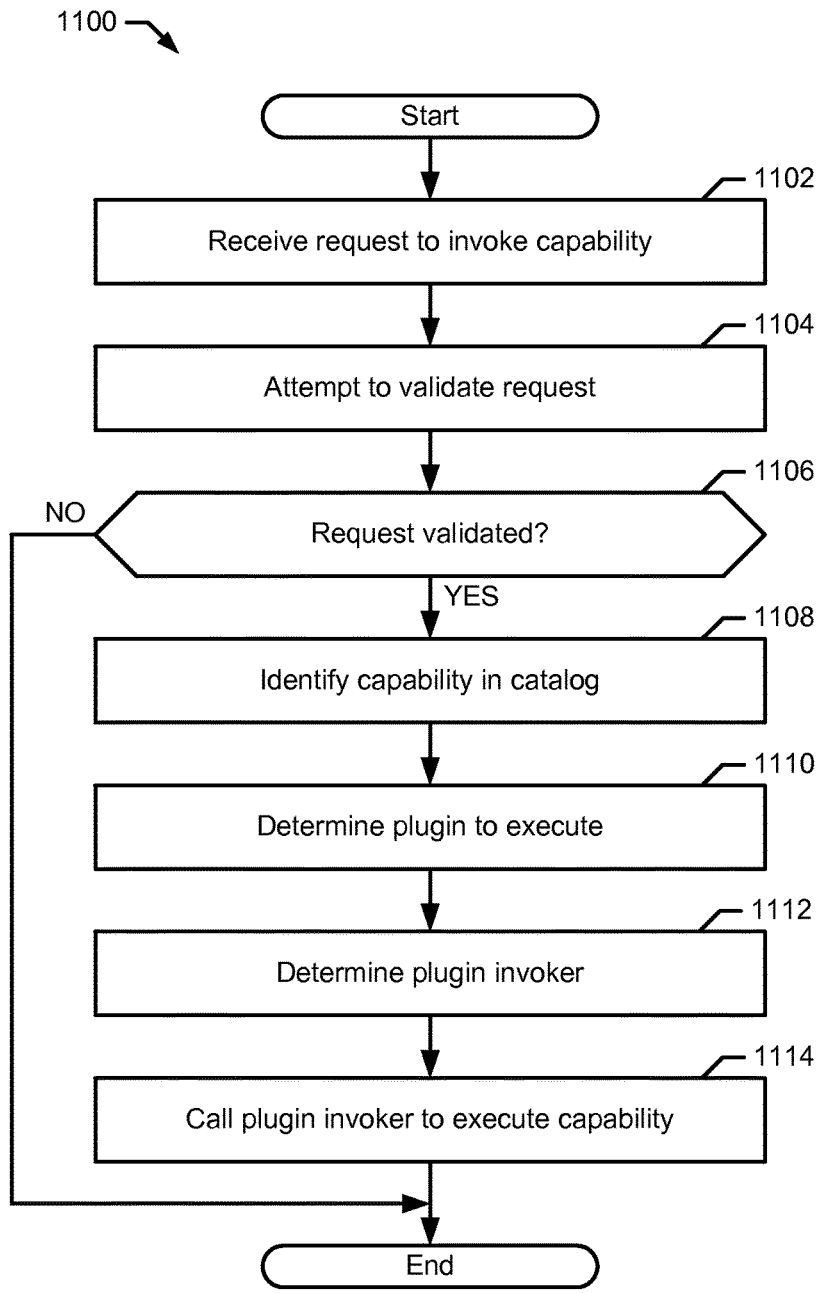

FIG. 11 is a flowchart representative of example machine-readable instructions 1100 that may be executed to implement the example capabilities management agent 118 of FIGS. 1A, 1B and/or 2 to execute a capability available to the example virtual machine(s) 110 in the computing environment 100. The example instructions 1100 of the illustrated example of FIG. 11 begin at block 1102 when the capabilities management agent 118 receives the example request 136 from the application 116. For example, the example communications interface 205 may receive, using AMQP communications, the request including the example capability identifier 138 and the example argument(s) 140. At block 1104, the security engine 210 attempts to validate the request 136. For example, the security engine 210 may utilize CMS standards to validate and decrypt the request. If, at block 1106, the security engine 210 determined it was unable to validate the request 136, the example program 1100 of FIG. 11 ends. In some examples, the security engine 210 may attempt to validate the request 136 until a time-out event is detected or a threshold number of incorrect attempts is satisfied.

If, at block 1106, the security engine 210 was able to validate the request 136, then, at block 1108, the example capabilities executor 225 identifies the capability in the catalog of capabilities 250. For example, the capabilities executor 225 may parse the example catalog of capabilities 250 using the capability identifier 138 included in the request 136. At block 1110, the example capabilities executor 225 determines the plugin 130 to execute the capability. For example, the capabilities executor 225 may map the capability identifier 138 to a plugin identifier 132.

At block 1112, the example capabilities executor 225 determines the plugin invoker 134 to call to execute the plugin 130. For example, the capabilities executor 225 may use the example plugins inventory 230 to map the plugin identifier 132 to a corresponding invoker identifier 135. At block 1114, the example capabilities executor 225 calls the plugin invoker 134 to execute the capability. For example, the capabilities executor 225 may include the capability identifier 138 and the argument(s) 140 in the call to the plugin invoker 134 to execute the capability. In some examples, the capabilities executor 225 may include a location in the example results data store 260 to store the output of executing the capability. The example program 1100 of FIG. 11 then ends.

Figure 12:
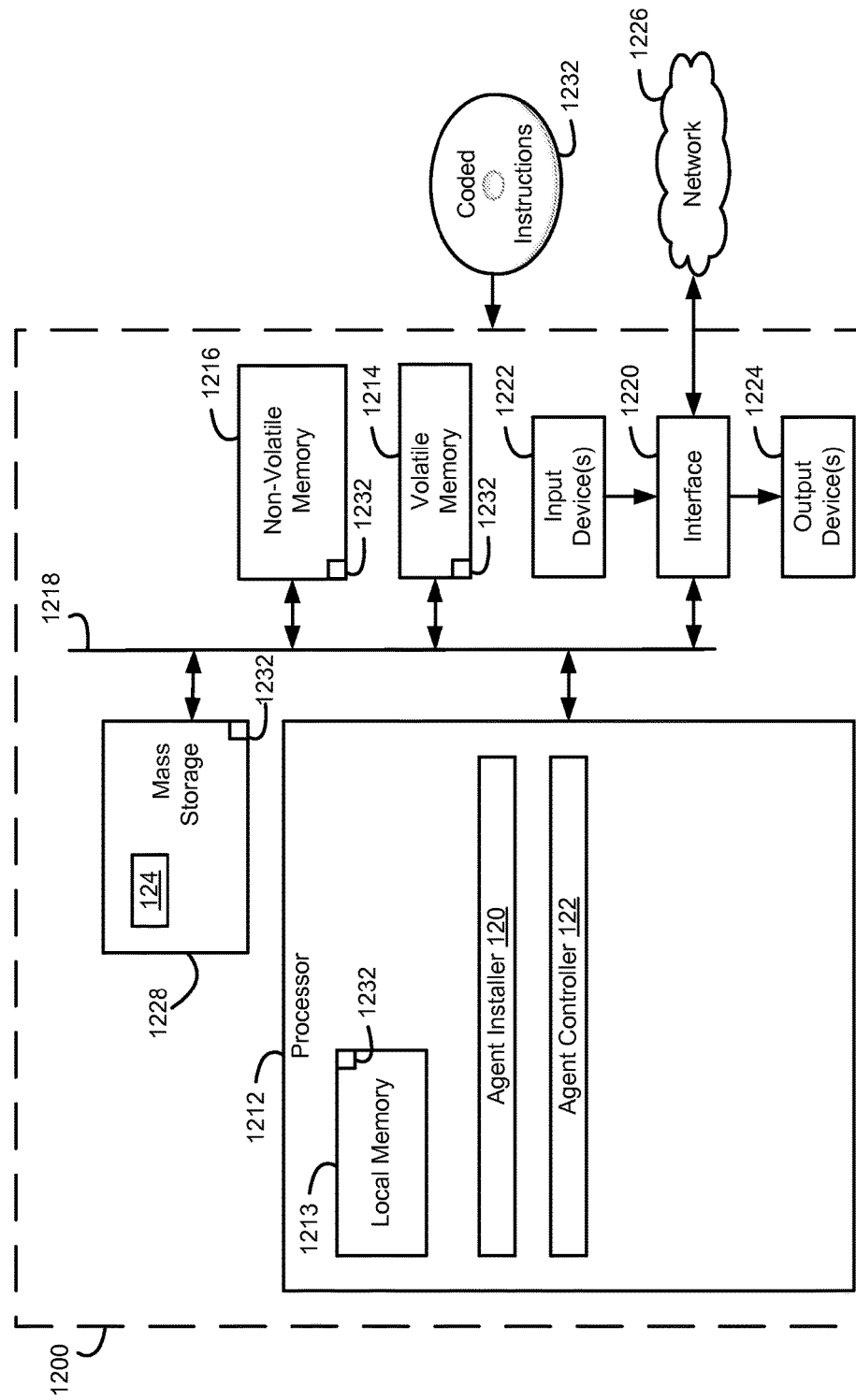
FIG. 12 is a block diagram of an example processing platform capable of executing the example machine-readable instructions of FIG. 9 to implement the example application of FIGS. 1A and/or 1B.

FIG. 12 is a block diagram of an example processor platform 1200 capable of executing the instructions of FIG. 9 to implement the application 116 of FIGS. 1A and/or 1B. The processor platform 1200 can be, for example, a server, a personal computer, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example executes the instructions to implement the example agent installer 120 and the example agent controller 122. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. The example mass storage 1228 implements the example data store 124.

The coded instructions 1232 of FIG. 9 may be stored in the mass storage device 1228, in the volatile memory 1214, in the non-volatile memory 1216, and/or on a removable tangible computer readable storage medium such as a CD or DVD.

Figure 13:
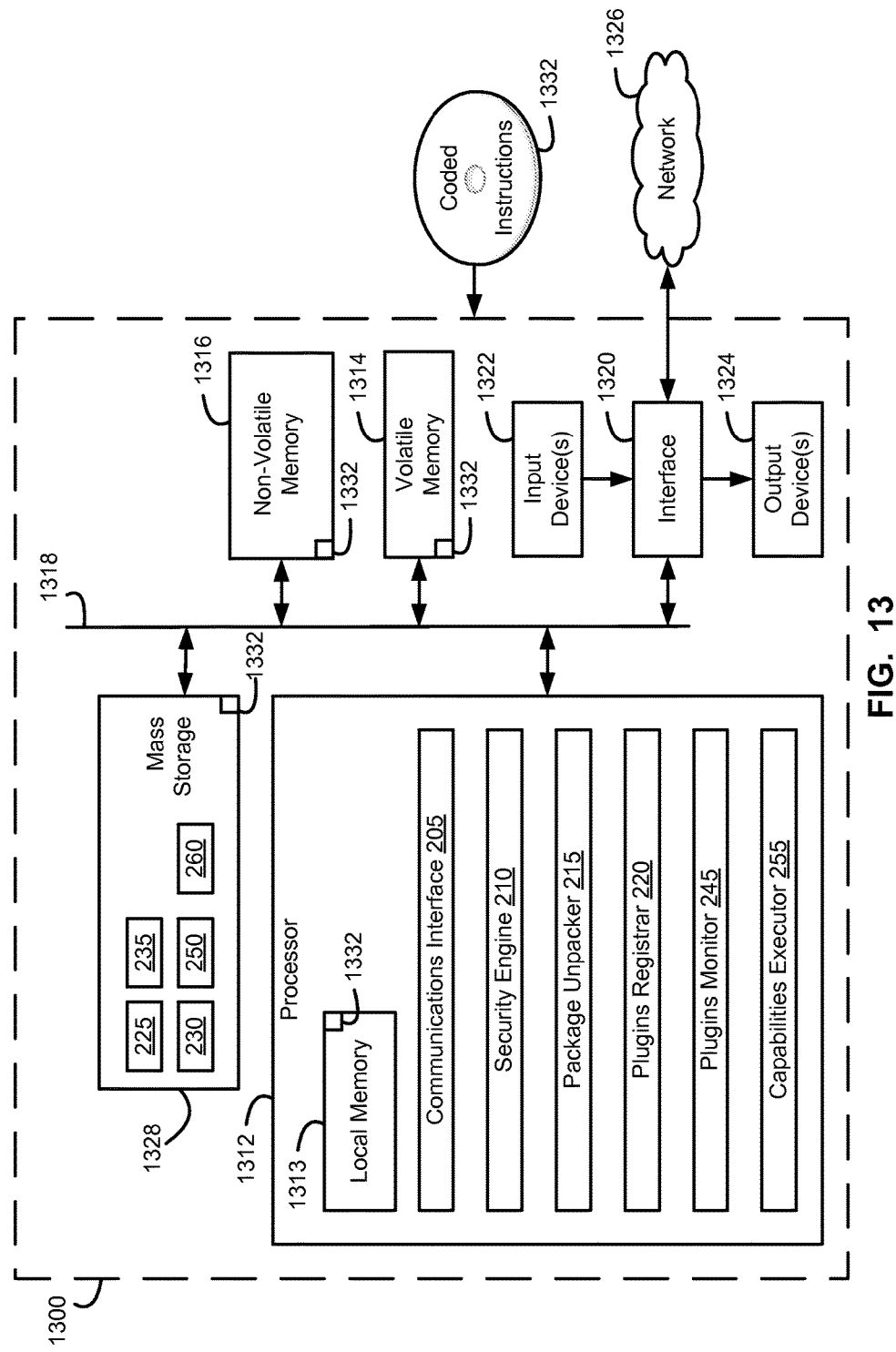
FIG. 13 is a block diagram of an example processing platform capable of executing the example machine-readable instructions of FIGS. 10 and/or 11 to implement the example capabilities management agent of FIGS. 1A, 1B and/or 2.

FIG. 13 is a block diagram of an example processor platform 1300 capable of executing the instructions of FIGS. 10 and/or 11 to implement the example capabilities management agent 118 of FIGS. 1A, 1B and/or 2. The processor platform 1300 can be, for example, a server, a personal computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example messaging interface 205, the example security engine 210, the example package unpacker 215, the example plugins registrar 220, the example plugins monitor 245 and the example capabilities executor 255.

The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The example mass storage 1328 implements the example plugins repository 225, the example plugins inventory 230, the example invokers repository 235, the example catalog 250 and the example results data store 260.

The coded instructions 1332 of FIGS. 10 and/or 11 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture provide a common agents framework for managing capabilities available at assets in computing environments.

The disclosed methods, apparatus and articles of manufacture facilitate maintaining a catalog of capabilities available at an asset. For example, a capabilities management agent installed at the asset may determine tasks that may be performed at the asset based on plugin(s) loaded at the asset. In addition, the disclosed methods, apparatus and articles of manufacture update the catalog of capabilities when a new plugin is added or detected. For example, the example capabilities management agent may retrieve a set of capabilities that may be performed by the new plugin. In some examples, the disclosed methods, apparatus and articles of manufacture reduce computing resources by maintaining a catalog of capabilities at the respective assets in the computing environment, which enables reducing the number of plugins installed at the assets, and reducing the number of plugins performing redundant capabilities at the assets. In some examples, the disclosed methods apparatus and articles of manufacture reduce usage of computing resources by utilizing standard formats for providing the catalog of capabilities and for storing the output of performing the respective capabilities, which facilitates different applications accessing the results rather than re-executing the capabilities. In some examples, the disclosed methods apparatus and articles of manufacture reduce usage of computing resources by enabling plugins to utilize plugin invokers, which facilitates support of plugins written in a variety of languages.

Furthermore, the example common agent framework disclosed herein is extensible. As described above, the example common agent framework disclosed herein includes a communication interface, a management agent and one or more plugins installed at an asset. The communication interface can be extended to use a Rabbit AMQP Broker, a ZeroMQ (socket-based) communications, REST, etc. The management agent facilitates extending by supporting additional scripts, libraries, decompression tools, etc. In addition, the management agent can support new plugins, thereby increasing the capabilities available for performing at the asset, but also conserving resources allocated to the asset by not installing redundant capabilities.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   maintaining a catalog of capabilities available to a virtualization asset based on plugins installed at the virtualization asset;
   in response to a request from a virtualization asset management application, determining whether a capability identified in a list of capabilities of the virtualization asset management application is installed at the virtualization asset based on the catalog of capabilities, the virtualization asset executing in a first container operating on top of a host operating system without the need for a hypervisor, the first container isolating the virtualization asset from applications executing in a second container operating on top of the host operating system, the first container not instantiating its own operating system;

installing the capability at the virtualization asset when the capability is not installed at the virtualization asset;

receiving, at the virtualization asset, a request to perform the capability from the virtualization asset management application, the request to perform the capability including a capability identifier corresponding to the capability;

validating, via a processor, the request; and in response to the validating, performing the capability, wherein performing the capability includes mapping, via the catalog of capabilities, the capability identifier to a plugin identifier, and executing a plugin corresponding to the plugin identifier.

2. A method as defined in claim 1, wherein maintaining the catalog of capabilities includes:

registering a plugin in an inventory of plugins;

retrieving a set of capabilities provided by the plugin; and updating the catalog of capabilities to include the set of capabilities.

3. A method as defined in claim 2, wherein registering the plugin in the inventory includes:

recording a plugin identifier associated with the plugin in the inventory; and recording a reference to a plugin invoker associated with the plugin, the plugin invoker facilitating executing the plugin at the virtualization asset.

4. A method as defined in claim 3, wherein the plugin identifier includes a namespace, a name and a version.

5. A method as defined in claim 3, wherein retrieving the set of capabilities includes calling the plugin invoker to provide the set of capabilities.

6. A method as defined in claim 2, wherein updating the catalog of capabilities includes:

logging the set of capabilities in the catalog of capabilities;

logging arguments needed to execute the respective capabilities; and mapping the respective capabilities to the plugin.

7. A method as defined in claim 2, further including transmitting the catalog of capabilities to an application in communication with the virtualization asset.

8. A method as defined in claim 7, further including encrypting a message including the catalog of capabilities.

9. A method as defined in claim 7, further including transmitting the catalog of capabilities in response to a request received by the application.

10. A method as defined in claim 7, further including transmitting the catalog of capabilities in response to updating the catalog of capabilities.

11. A method as defined in claim 8, wherein validating the request includes decrypting the message.

12. A method as defined in claim 1, wherein the capability identifier includes at least a class namespace, a class name, a class version or a capability name.

13. A method as defined in claim 1, wherein executing the plugin includes:

calling a plugin invoker to facilitate executing the plugin by loading a resource used by the plugin; and invoking the plugin.

14. An apparatus comprising:

a plugins monitor to: (a) maintain a catalog of capabilities available to a virtualization asset based on plugins installed at the virtualization asset, and (b) in response to a request from a virtualization asset management application, determine whether a capability identified in a list of capabilities of the virtualization asset management application is installed at the virtualization asset based on the catalog of capabilities, the virtualization asset executing in a first container operating on top of a host operating system without the need for a hypervisor, the first container isolating the virtualization asset from applications executing in a second container operating on top of the host operating system, the first container not instantiating its own operating system;

a plugins registrar to install the capability at the virtualization asset when the capability is not installed at the virtualization asset;

a security engine to validate a request to perform the capability, the request to perform the capability including a capability identifier corresponding to the capability; and a capabilities executor to, when the request to perform the capability is validated, map, via the catalog of capabilities, the capability identifier to a plugin identifier, and execute a plugin corresponding to the plugin identifier, at least one of the plugins monitor, the plugins registrar, the security engine or the capabilities executor including hardware.

15. A tangible computer readable storage medium comprising instructions that, when executed, cause a machine to at least:

maintain a catalog of capabilities available to a virtualization asset based on plugins installed at the virtualization asset;

in response to a request from a virtualization asset management application, determine whether a capability identified in a list of capabilities of the virtualization asset management application is installed at the virtualization asset based on the catalog of capabilities, the virtualization asset executing in a first container operating on top of a host operating system without the need for a hypervisor, the first container isolating the virtualization asset from applications executing in a second container operating on top of the host operating system, the first container not instantiating its own operating system;

install a capability at the virtualization asset when the capability is not installed at the virtualization asset;

validate a request to perform the capability, the request to perform the capability including a capability identifier corresponding to the capability; and when the request to perform the capability is validated, map, via the catalog of capabilities, the capability identifier to a plugin identifier, and execute a plugin corresponding to the plugin identifier, the plugin to perform the capability.

16. A system comprising:

at least one processor;

memory including computer executable instructions, that when executed by the at least one processor, cause a virtualization asset management application to:

determine whether a capability identified in a list of capabilities of the virtualization asset management application is installed at a virtualization asset based on a catalog of capabilities available to the virtualization asset and based on plugins installed at the virtualization asset, the virtualization asset executing in a first container operating on top of a host operating system without the need for a hypervisor, the first container isolating the virtualization asset from applications executing in a second container operating on top of the host operating system, the first container not instantiating its own operating system; and initiate installing the capability at the asset when the capability is not installed at the asset; and a capabilities management agent to:

maintain the catalog of capabilities available to the asset;

validate a request to perform the capability, the request to perform the capability including a capability identifier corresponding to the capability; and in response to the validating, map, via the catalog of capabilities, the capability identifier to a plugin identifier, and execute a plugin corresponding to the plugin identifier, the plugin, when executed, to perform the capability.

* * * * *